United States Patent [19]
Boisseau et al.

[11] Patent Number: 4,581,732
[45] Date of Patent: Apr. 8, 1986

[54] TIME-SPACE-TIME SWITCHING NETWORK USING A CLOSED-LOOP LINK

[76] Inventors: Marc Boisseau, Chemin des Esperiroures, 06770 Gattieres; Jean C. Borie, Val des Roses, Chemin des Lauriers, 06600 Antibes; Alain Croisier, 1, avenue des Acacias, 06800 Cagnes Sur Mer; Michel Demange, 902, route de Gattieres, 06640 Saint Jeannet; Gerald Lebizay, 61, Avenue du Dauphine, 0600, Nice; Jean-Pierre P. Rossi, 23, allee de la Garennotte, 33160 Cestas, all of France

[21] Appl. No.: 563,493

[22] Filed: Dec. 20, 1983

[30] Foreign Application Priority Data

Dec. 28, 1982 [EP] European Pat. Off. ....... 82 430042.7

[51] Int. Cl.$^4$ .......................... H04Q 11/04; H04J 3/00
[52] U.S. Cl. ...................................................... 370/63
[58] Field of Search .................... 370/63, 86, 88, 67; 340/825.05

[56] References Cited

U.S. PATENT DOCUMENTS 3,569,632  3/1971  Beresin et al. ........................ 370/86
3,921,137  11/1975  McClearn, Jr. et al. ............. 370/86
3,925,621  12/1975  Collins et al. ......................... 370/88
4,042,783  8/1977  Gindi ...................................... 370/86

Primary Examiner—Douglas W. Olms
Assistant Examiner—Wellington Chin

[57] ABSTRACT

A switching network for selectively connecting at least one input time-division channel on an input link (IL) to at least one output time-division channel on an output link (OL). The network is organized around a closed-loop link (10) on which circulates a multiplex message carrying 512 time-division exchange channels. The input and output links (LE and LS) are respectively multiplexed onto an input multiplex link (IML) and an output multiplex link (OML) which are coupled to the closed loop (10) by a switching module (SM). Each switching module comprises an input buffer (IB), an output buffer (OB) and a local buffer (LB) the addressing of which is selectively controlled by a time slot counter (CRT) or a corresponding pointer memory. So-called "broadcast" connections coupling one input channel to several output channels, and "in-cast" connections coupling several input channels to one output channel, can be established. Each of these connections uses only one exchange channel.

18 Claims, 19 Drawing Figures

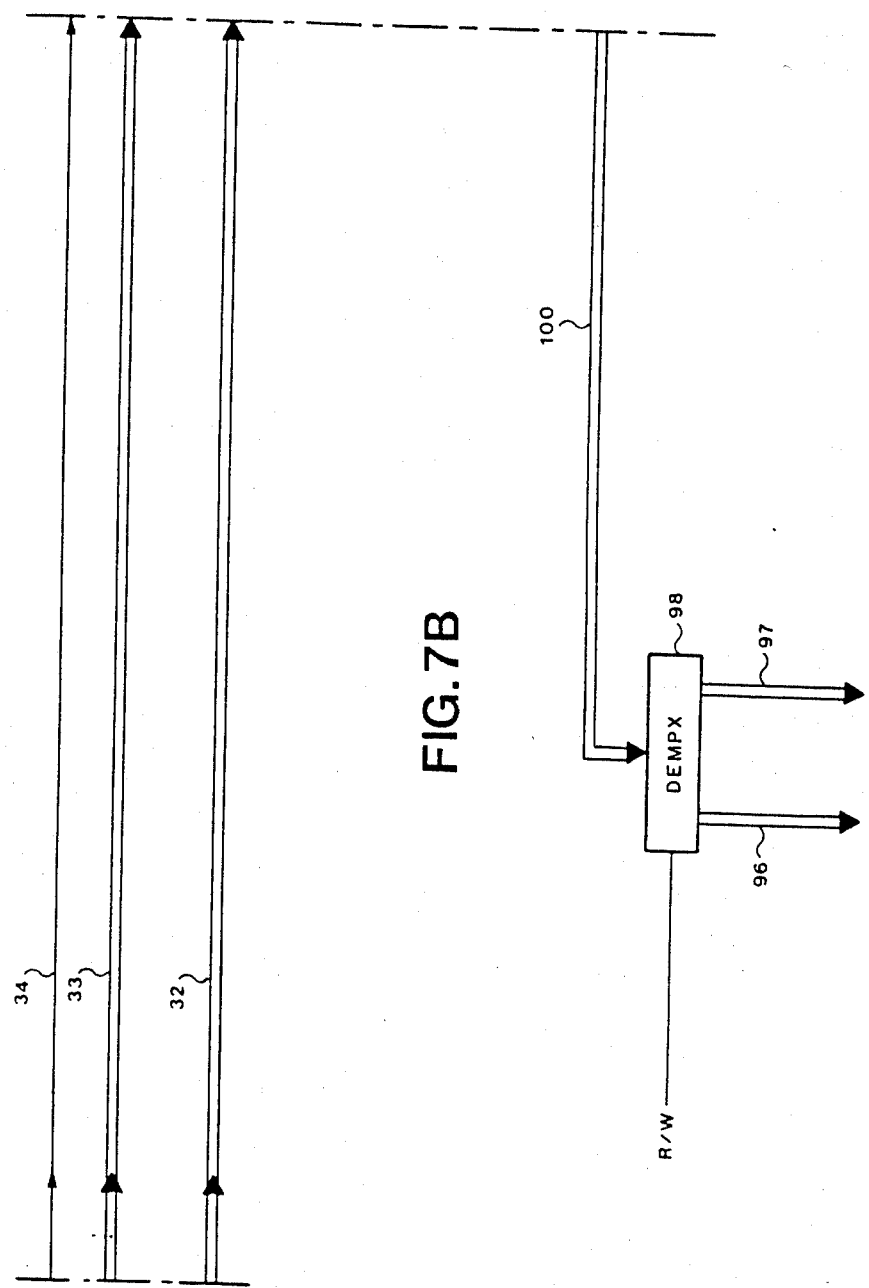

TIME-SPACE-TIME SWITCHING NETWORK USING A CLOSED-LOOP LINK

BACKGROUND OF THE INVENTION

1. Field of the Invention

This invention relates to digital switching networks and, more particularly, to a time-space-time switching network that uses a closed-loop link and is capable of switching digitalized voice signals as well as data signals. This switching network lends itself particularly well to use in a computer-controlled private automatic branch exchange (PABX).

2. Prior Art

The recent advances made in printed circuit technology and voice signal digitalization techniques have led to the introduction of time-division switching networks heretofore considered too complex for practical implementation. The basic component of such a network is conventionally comprised of a so-called switching memory into which the contents of incoming time-division channels are sequentially written at addresses corresponding to the numbers allocated to said channels and from which they are read under the control of a memory which sequentially provides the addresses that correspond to the numbers allocated to the outgoing time-division channels. Because a switching memory has but a limited capacity, sets of such memories arranged in matrices are generally employed whenever large volumes of traffic must be dealt with. Arrangements of this type are usually called time-space-time switching networks and are described, for example, in European patent application No. EP-A-39,134. However, the complexity of these networks, while acceptable if the volume of traffic involves more than 15,000 lines, renders their use impractical in the case of a PABX.

British Pat. No. GB-A-1,363,357 describes a time-division switching network organized around a closed-loop link operating in the time-division multiplex mode and closed by a control unit. The control unit establishes thereon time-division communication channels and time-division signaling channels that are seized by subscriber stations directly connected to the loop. However, this network has a limited switching capability and requires the use of intelligent subscriber stations specifically designed for this particular use.

SUMMARY OF THE INVENTION

It is an object of this invention to eliminate the disadvantages, as briefly discussed above, of the prior art switching networks by providing a time-space-time switching network that is relatively simple and to which any type of subscriber station or data station can be attached.

Generally, the invention provides a switching network for selectively coupling at least one of the input time-division channels of an input multiplex link to at least one of the output time-division channels of an output multiplex link. The switching network includes a unidirectional closed-loop link referred to as a ring that operates in the time-division multiplex mode with recurrent frames of equal duration and is arranged for continuous circulation of a multiplex message the duration of which equals that of a frame and which includes time-division exchange channels; a closed-loop synchronization link over which circulates a frame synchronizing signal that is synchronized with the multiplex message; ring control means for causing the time taken by a multiplex message to travel around the ring to remain constant and equal to the duration of a frame; and a plurality of switching modules.

Each switching module couples the ring to an input multiplex link and to the corresponding output multiplex link and includes an input time-division switch for selectively coupling at least one of the input time-division channels of the input multiplex link to at least one time-division exchange channel; ring gate means for selectively coupling the input time-division switch to the ring; an output time-division switch for selectively coupling at least one time-division exchange channel to at least one of the output time-division channels of the output multiplex link; control means for controlling the input and output time-division switches and the gate means in response to control messages received from a controller; and a time slot counter synchronized with the frame synchronizing signal for providing synchronization between the input and output time-division switches, the gate means and the control means.

In accordance with one feature of the invention, each switching module further includes a local time-division switch for selectively coupling at least one input time-division channel on the input multiplex link to at least one output time-division channel on the output multiplex link.

In accordance with another feature of the invention, each input, output or local time division switch includes a buffer that is selectively addressed by the time slot counter or by the contents of a pointer memory.

The foregoing and other objects features and advantages of the invention will be apparent from the following more particular description of a preferred embodiment of the invention, as illustrated in the accompanying drawings.

DESCRIPTION OF THE PREFERRED EMBODIMENT

Figure 1:
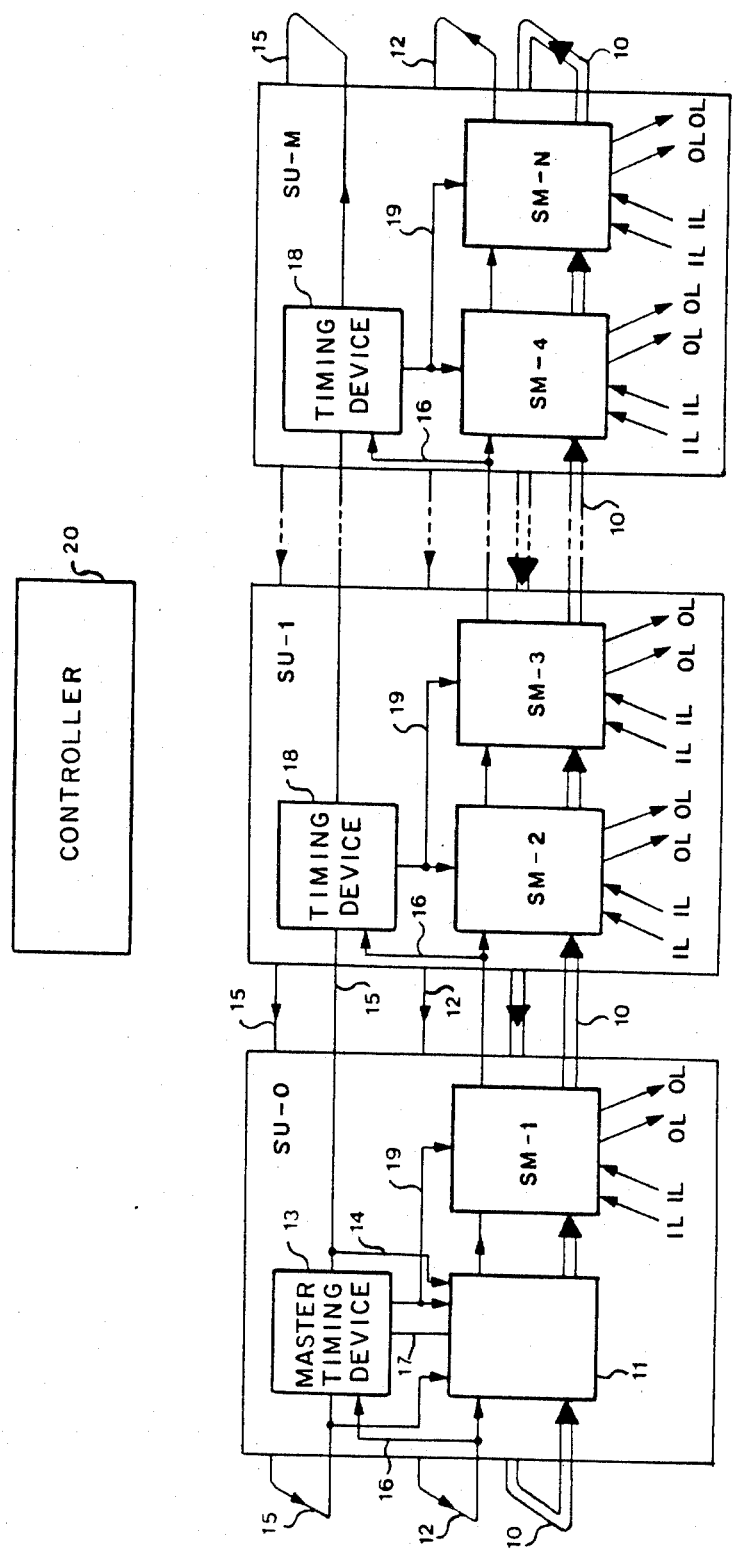
FIG. 1 is a schematic illustration of the general arrangement of a switching network in accordance with the invention.

Referring now to FIG. 1, there is shown the general arrangement of a switching network in accordance with the invention for selectively connecting one or more input time-division channels (referred to hereinafter as time channels) on one or more input interface links IL to one or more output time channels on one or more output interface links OL. The switching network is organized around a unidirectional closed-loop link 10 referred to hereinafter as a ring. The ring operates in the time-division multiplex mode with recurrent frames that have a duration of 125 microseconds each. A multiplex message the duration of which equals that of a frame and which carries, say, 512 time channels called exchange channels circulates continuously on ring 10. The interface links IL and OL are arranged in groups each of which is connected to the ring through a switching module SM. The number of switching modules depends upon the number of interface links to be connected and the switching capability of the modules. The switching modules themselves are arranged in groups within the switching units SU. As shown in FIG. 1, switching unit SU-0 includes a single switching module SM-1, switching unit SU-1 includes two switching modules SM-2 and SM-3, and switching unit SU-M also includes two switching modules SM-4 and SM-N. Switching unit SU-0 differs from the other units in that it includes a ring control device 11 which ensures that the time taken by a multiplex message to circulate around the ring remains constant and equal to 125 microseconds. A frame synchronizing (FS) signal circulates on a synchronization loop 12 that runs parallel to the ring and is, therefore, connected to ring control device 11 and to the successive switching modules SM-1 to SM-N. A master timing device 13 located in switching unit SU-0 provides a 2.048 MHz timing signal which is fed via a line 14 to ring control device 11 and also to the successive switching units via a closed loop 15. The FS signal applied to ring control device 11 via line 12 is also received via a line 16 by master timing device 13. This signal is regenerated in device 13 and is then applied to ring control device 11 via a line 17. In each switching unit SU-1 . . . SU-M, the 2.048 MHz timing signal supplied by master timing device 13 in unit SU-0 is regenerated by a slave timing device 18, which also receives the frame synchronizing signal via a line which, for simplicity, is also labeled 16. Each timing device 13, 18 generates a 16.384 MHz timing signal which is applied to all switching unit elements via a line 19. A controller 20 controls the various switching units.

Before proceeding to a detailed description of the invention, the various functions of the switching network will be described in relation to FIG. 2, which only shows three switching modules SM-1, SM-2, SM-N, which may be located in the same or in different switching units, and ring control device 11. In the embodiment shown in FIG. 2 and to be described in more detail later, each interface link IL, OL operates in the time-division multiplexing mode with recurrent frames of 125 microseconds each of which can carry 32 time channels one 8-bit byte wide each. Each byte may comprise either eight data bits sent to or received from a digital station such as a data terminal, or a digital-coded voice sample sent to or received from an analog station such as a subscriber's telephone set. Each switching module couples ring 10 to a group of sixteen input interface links and to a corresponding group of sixteen output interface links. The sixteen input interface links are multiplexed onto an input multiplex link IML through an input adapter (designated ADAPT-IN). Each input multiplex link operates in the time-division multiplexing mode with 125 microseconds frames each of which can carry 512 channels one byte wide each. The sixteen output interface links are obtained by demultiplexing an output multiplex link OML by means of an output adapter (designated ADAPT-OUT). Each output multiplex link operates in the time-division multiplex mode with 125-microsecond frames each of which can carry 512 channels one byte wide each. In each switching module, the frames present on the ring, on multiplex links IML,OML, and on the interface links IL, OL are synchronized with one another.

All switching modules are identical. Each switching module is mainly comprised of a time slot counter CTR, a gate referred to as a ring gate RG, an input time-division switch, an output time-division switch, and a local time-division switch (called input, output and local time switches hereinafter). Ring gate RG is controlled by a gate pointer memory GPM containing a number of one-bit storage locations equivalent to the number of exchange channels available within a frame, that is, 512. The input time switch is mainly comprised of an input buffer IB which has its input connected to the input multiplex link and which has its output connected to the ring through ring gate RG. The input buffer IB contains a number of 8-bit storage locations equivalent to the number of exchange channels provided within a frame, and selectively addressed under the control of the time slot counter CTR or of an input pointer memory IPM that contains a number of storage locations equivalent to the number of channels provided in an input multiplex link IML. The output time switch is mainly comprised of an output buffer OB the input of which is connected to the ring and the output of which is connected to the output multiplex link OML. The output buffer OB contains a number of storage locations equivalent to the number of exchange channels provided in a frame, and is selectively addressed under the control of the counter CTR or an output pointer memory OPM. The local time switch is mainly comprised of a local buffer LB the input of which is connected to the input multiplex link IML and the output of which is connected to the output multiplex link OML. The local buffer LB is similar to the output buffer OB and is selectively addressed under the control of the counter CTR or a local pointer memory LPM. In FIG. 2, the various elements of switching modules SM-1, SM-2 and SM-N are identified by means of suffixes 1, 2 and N, respectively.

Figure 2:
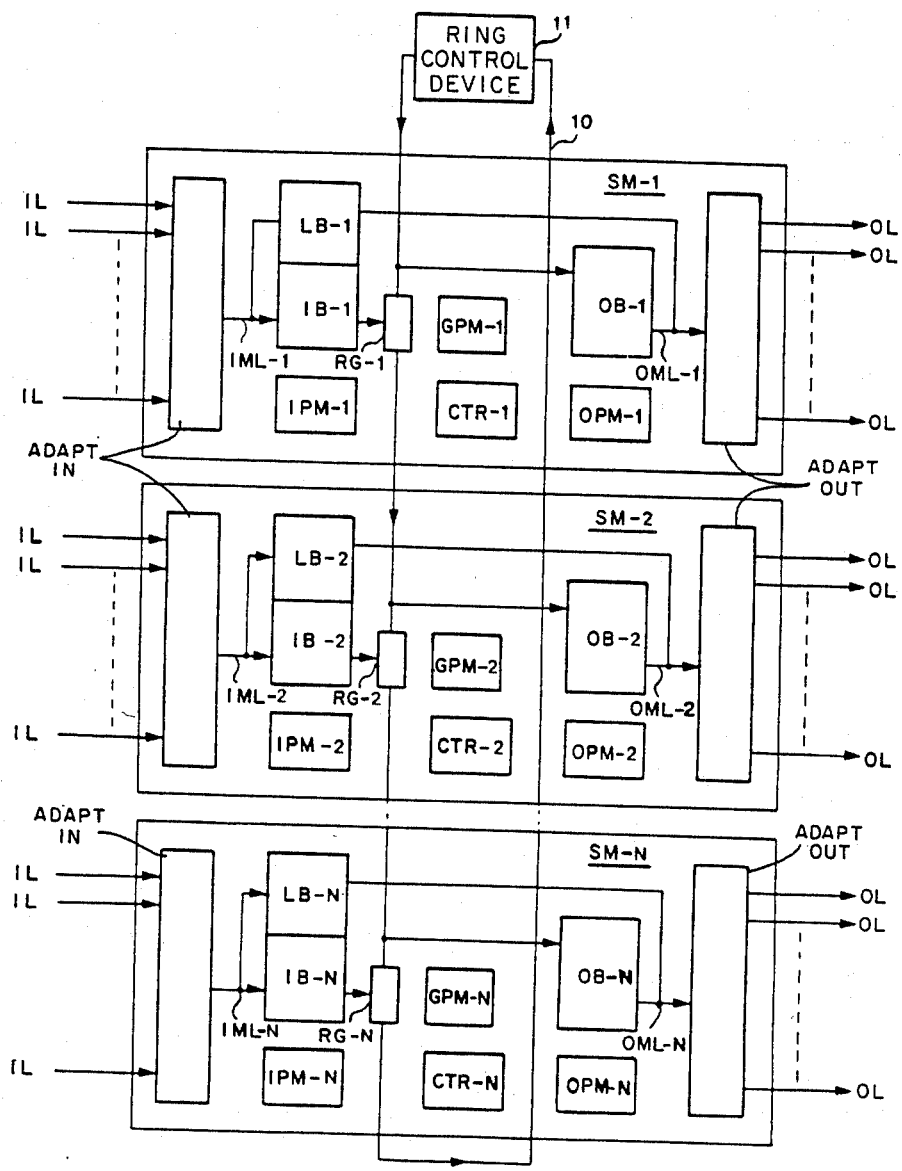
FIG. 2 is a schematic illustration of the data flow in the switching network of FIG. 1.

The switching network of FIG. 2 provides considerable flexibility in switching data channels and voice channels, as the examples given below will show.

BIDIRECTIONAL COMMUNICATIONS BETWEEN TWO STATIONS RESPECTIVELY ATTACHED TO DIFFERENT SWITCHING MODULES

Figure 3:
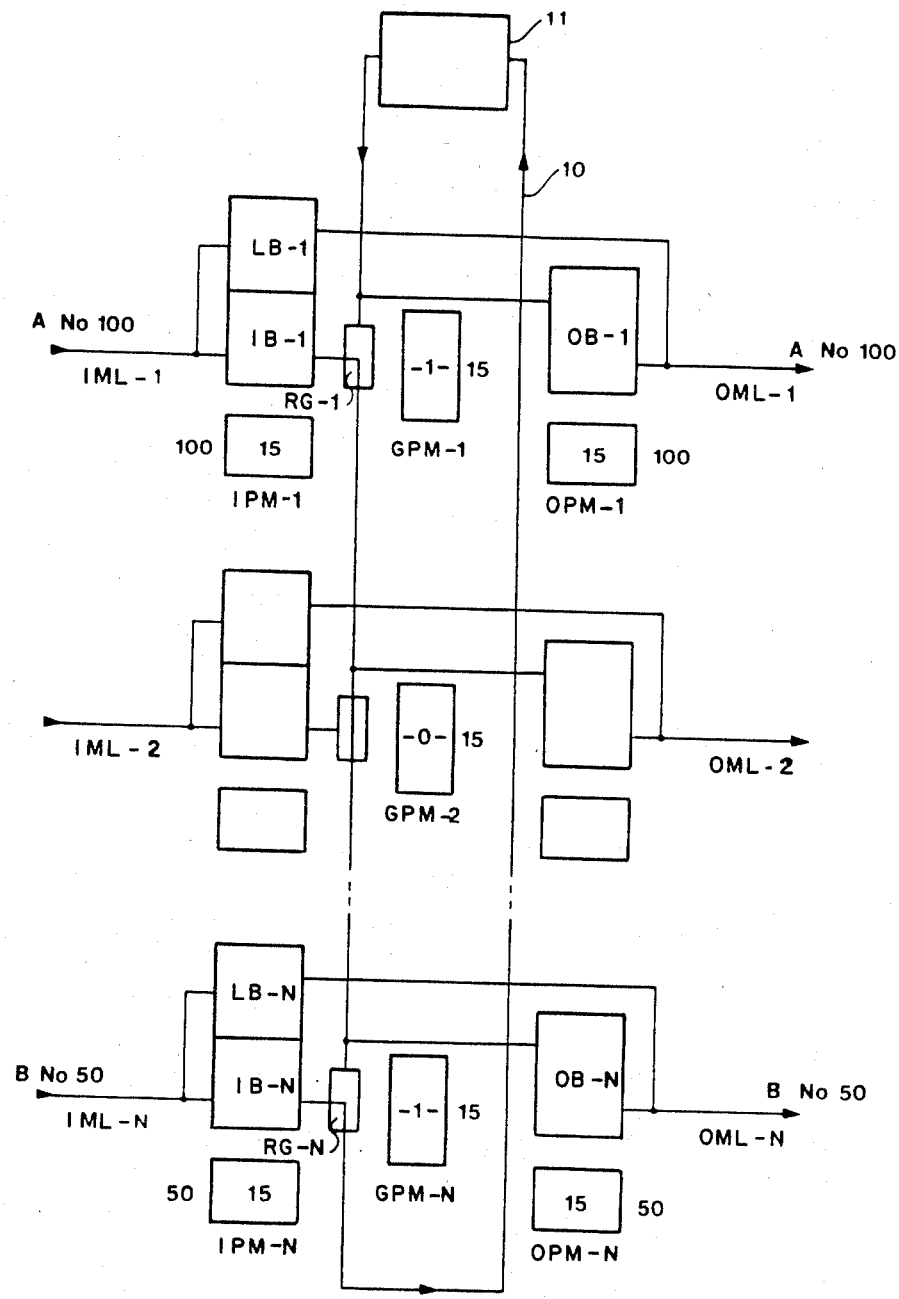
FIG. 3 is a schematic illustration of a bidirectional communication established between two stations, A and B, respectively attached to switching modules SM-1 and SM-N.

FIG. 3 is a schematic illustration of a connection established between two stations A and B respectively attached to switching modules SM-1 and SM-N. Assume that controller 20 which manages the switching network has allocated channel 100 on multiplex links IML-1 and OML-1 to station A and channel 50 on multiplex links IML-N and OML-N to station B. To establish a connection between stations A and B, controller 20 must find an available exchange channel on the ring. Assume further that exchange channel 15 is available and has been allocated to this particular connection. The pointer memories are loaded as follows:

the 15th storage location in each of gate pointer memories GPM-1 and GPM-N is set to "1" and the 15th storage location in each of the other gate pointer memories of the network is set to "0"; and the address "15" is written in storage location 100 of pointer memories IPM-1 and OPM-1 and, in location 50 of pointer memories IPM-N and OPM-N.

CONNECTIONS FROM A TO B

In each switching module, the actuation of the time slot counter CTR is synchronized with the occurence of the exchange channels on the ring and the channels on multiplex links IML and OML. During a given cycle of 125 microseconds, such as cycle n, counter CTR-1, upon reaching the count of 100, addresses storage location 100 of input pointer memory IPM-1, the input pointer read out of this location addresses location 15 of input buffer IB-1, and the 8-bit byte from station A that is present on channel 100 of input multiplex link IML-1 is stored in location 15 of input buffer IB-1.

During the next cycle, upon reaching the count of 15, counter CTR-1 addresses the 15th storage location of gate pointer memory GPM-1, the gate pointer read out of that location causes ring gate RG-1 to couple the output of input buffer IB-1 to the ring, and the contents of the 15th storage location IB-1 are placed onto exchange channel 15. When channel 15 reaches switching module SM-N, the contents thereof are stored in storage location 15 of output buffer OB-N under control of counter CTR-N. During the next cycle, counter CTR-N, upon reaching the count of 50, addresses storage location 50 of output pointer memory OPM-N, the output pointer read out of that location addresses storage location 15 of output buffer OB-N and the contents thereof, that is, the 8 bits from station A, are placed onto channel 50 of output link OML-N to be transferred to station B. The process just described is repeated during each cycle until such time as the connection from A to B is terminated.

CONNECTIONS FROM B TO A

Connections from B to A are similar to connections from A to B. It should however be noted that, in both cases, the same exchange channel, 15, is always used. In the previous example, when exchange channel 15 reached switching module SM-N, the 8-bit byte from station A that was present on channel 15 was transferred to station B. This byte is here replaced by a byte received from station B through ring gate RG-N, input buffer IB-N and channel 50 on input link IML-N. Exchange channel 15, which now carries the byte from station B, is propagated around the ring and through ring control device 11, and its contents are loaded in storage location 15 of output buffer OB-1 to be transferred to station A via channel 100 of output multiplex link OML-1.

BIDIRECTIONAL CONNECTIONS BETWEEN TWO STATIONS ATTACHED TO THE SAME SWITCHING MODULE (LOCAL CONNECTIONS)

Figure 4:
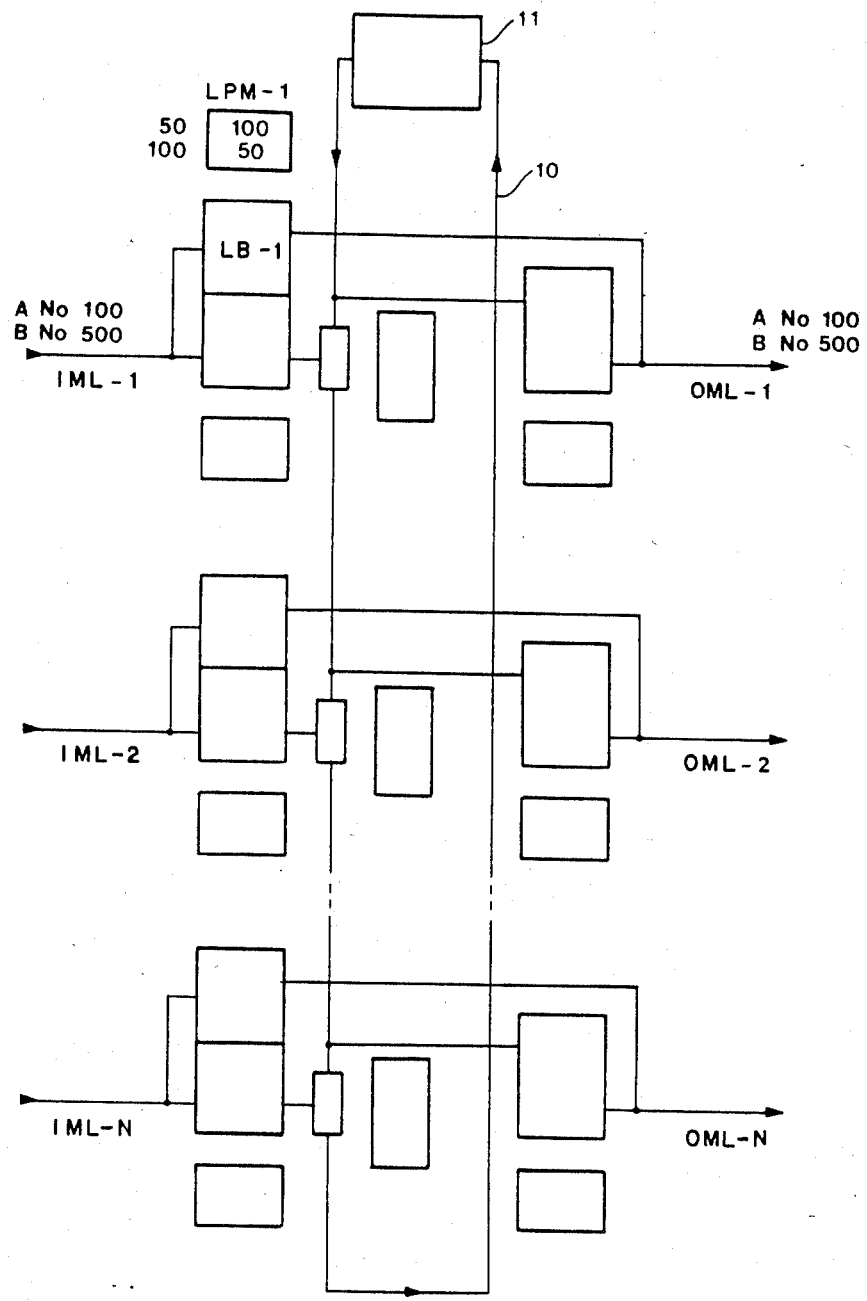
FIG. 4 is a schematic illustration of a bidirectional communication established between two stations, A and B, attached to the same switching module.

A local connection uses no exchange channel on the ring and is established by means of the local time switch provided in each switching module. FIG. 4 is a schematic illustration of a connection established between two stations, A and B, both of which are attached to switching module SM-1. It will be assumed that channel 100 of links IML-1 and OML-1 is assigned to station A and channel 50 to station B. Storage locations 50 and 100 of pointer memory LPM-1 are loaded with addresses 100 and 50, respectively. During a given cycle, when counter CTR-1 reaches the count of 50, the byte transferred from station B on channel 50 of link IML-1 is stored in storage location 50 of input buffer IB-1, and when counter CTR-1 reaches the count of 100, the byte transferred from station A on channel 100 is stored in location 100 of local buffer LB-1. During the next cycle, counter CTR-1, when it reaches the count of 50, addresses storage location 50 of pointer memory LPM-1 and the pointer read out of that location addresses location 100 of local buffer LB-1, the contents of which are placed on channel 50 of link OML-1 to be transferred to station B. Similarly, when counter CTR-1 reaches the count of 100, the byte from station B, which is stored in storage location 50 of local buffer LB-1, is placed on channel 100 of link OML-1 to be transferred to station A.

UNIDIRECTIONAL CONNECTIONS BETWEEN ONE TRANSMITTING STATION AND SEVERAL RECEIVING STATIONS ("BROADCASTING")

Figure 5:
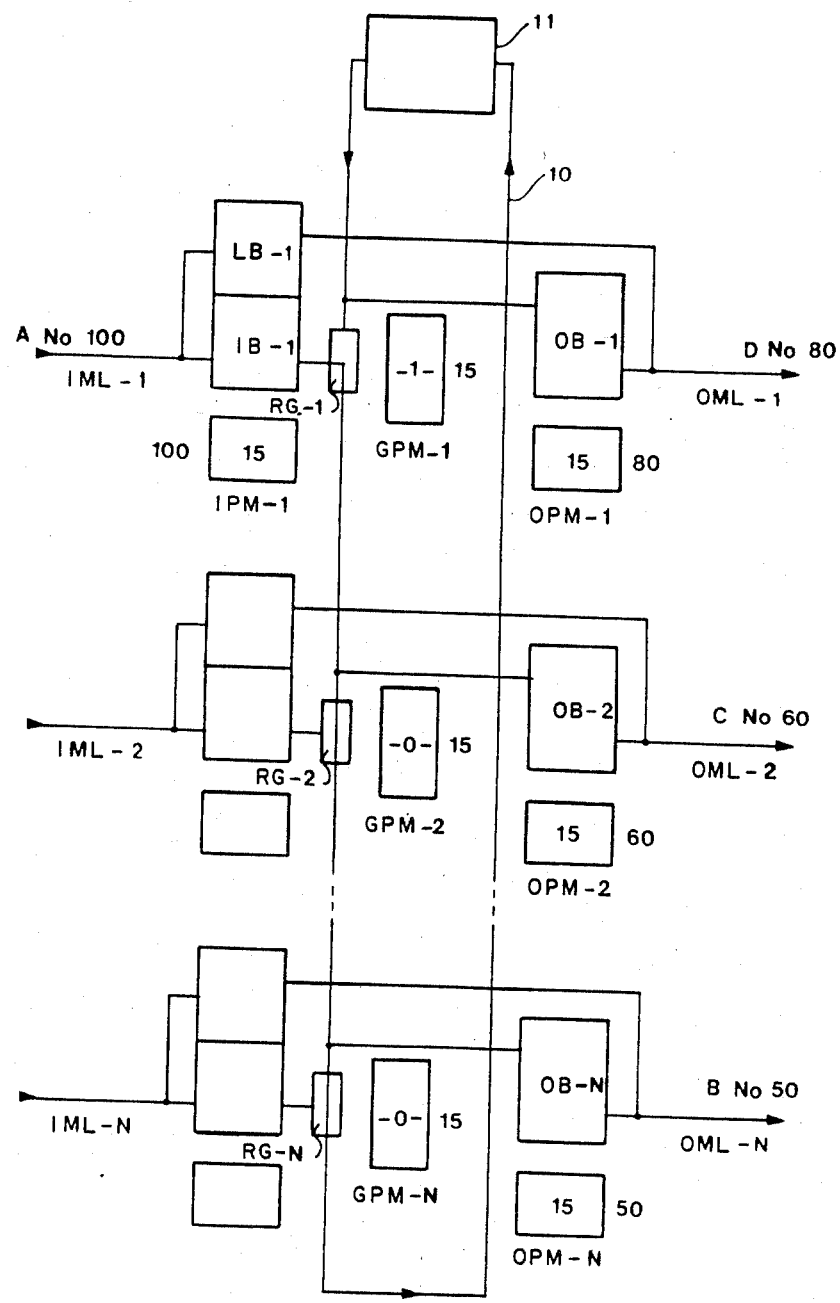
FIG. 5 is a schematic illustration of a so-called "broadcast" type of unidirectional communication between one transmitting station and several receiving stations.

FIG. 5 is a schematic illustration of a unidirectional connection established between a transmitting station A attached to switching module SM-1 and three receiving stations D, C and B, respectively attached to switching modules SM-1, SM-2 and SM-N. This type of connection will be termed "broadcasting" hereinafter. It will be assumed that channel 100 of input link IML-1 is allotted to station A, that channels 80, 60, and 50 of the respective output links OML-1, OML-2 and OML-N are respectively allocated to stations D, C and B, and that exchange channel 15 is allocated to the connection. Storage location 15 of gate pointer memory GPM-1 is set to "1", and locations 15 in the other gate pointer memories of the network are all set to "0". Address "5" is loaded in storage location 100 of input pointer memory IPM-1, in location 80 of output pointer memory OPM-1, in location 60 of pointer memory LPM-2 and in location 50 of output pointer memory OPM-N. A byte from station A is transferred via exchange channel 15 as explained earlier. When exchange channel 15 reaches switching module SM-2, the contents of the channel are loaded in storage location 15 of output buffer OB-2, whence they will be transferred to station C via channel 60 of output link OML-2, as previously explained. When exchange channel 15 reaches switching module SM-N, the contents thereof are loaded in storage location 15 of buffer OB-N, whence they will be transferred to station B via channel 50 of output link OML-N. When exchange channel 15 reaches switching module SM-1 after passing through ring control device 11, the contents of channel 15 are placed in storage location 15 of buffer OB-1, whence they will be transferred to station D via channel 80 of output link OML-1. This type of connection is quite straightforward and involves the use of a single exchange channel, regardless of the number of receiving stations.

UNIDIRECTIONAL CONNECTIONS BETWEEN SEVERAL TRANSMITTING STATIONS AND ONE RECEIVING STATION ("IN-CASTING")

Figure 6:
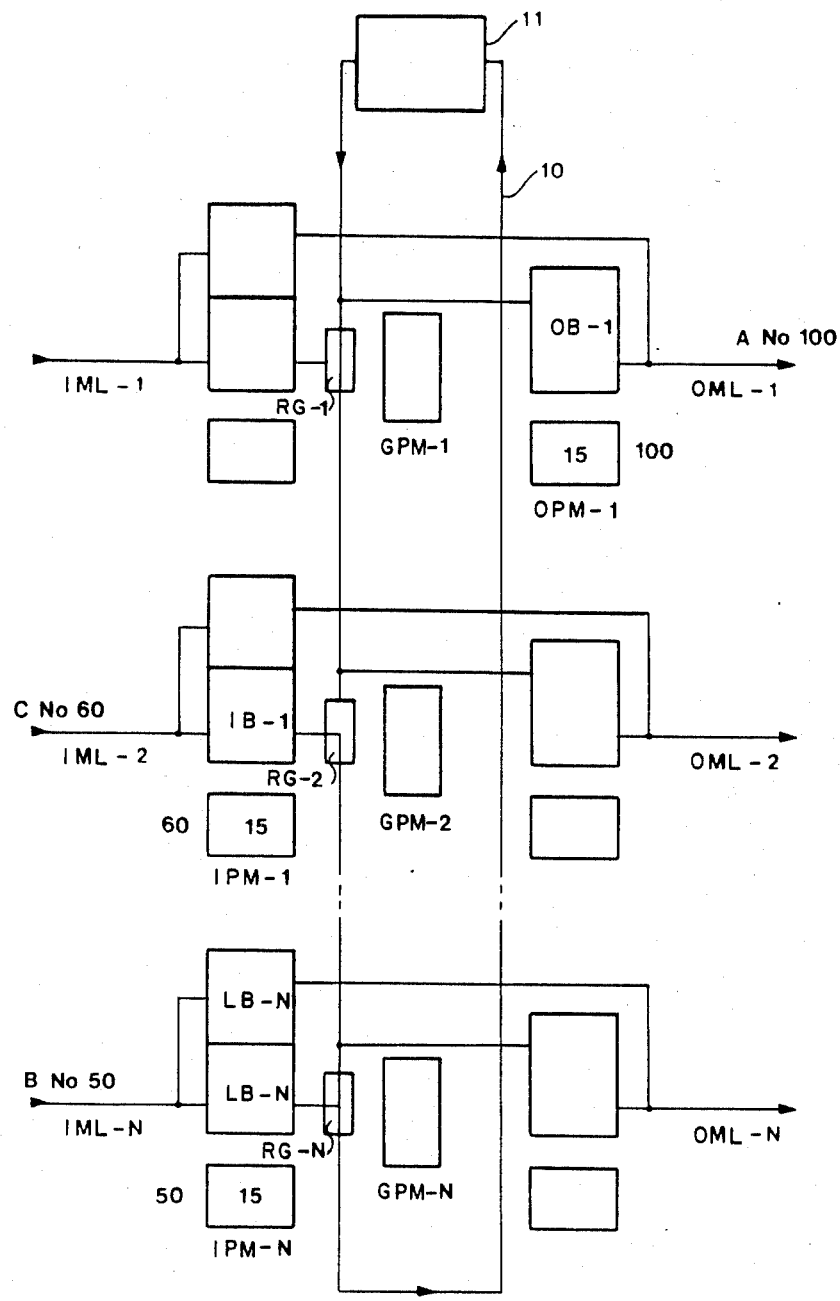
FIG. 6 is a schematic illustration of a so-called "incast" type of unidirectional communication between several transmitting stations and one receiving station.
Figure 7F:
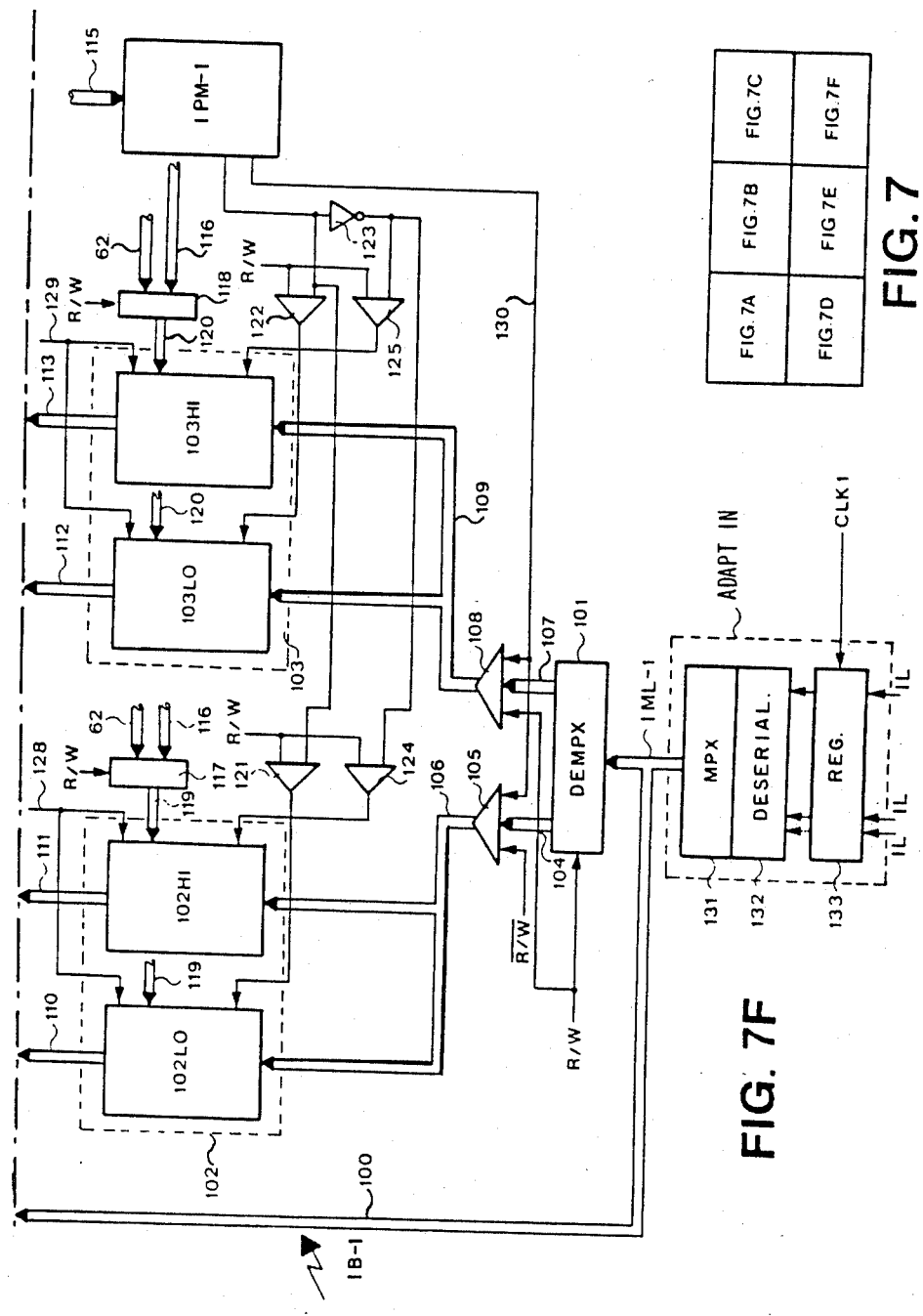
FIG. 7, comprised of FIGS. 7A–7F, in a block diagram of a switching module.
Figure 7A:
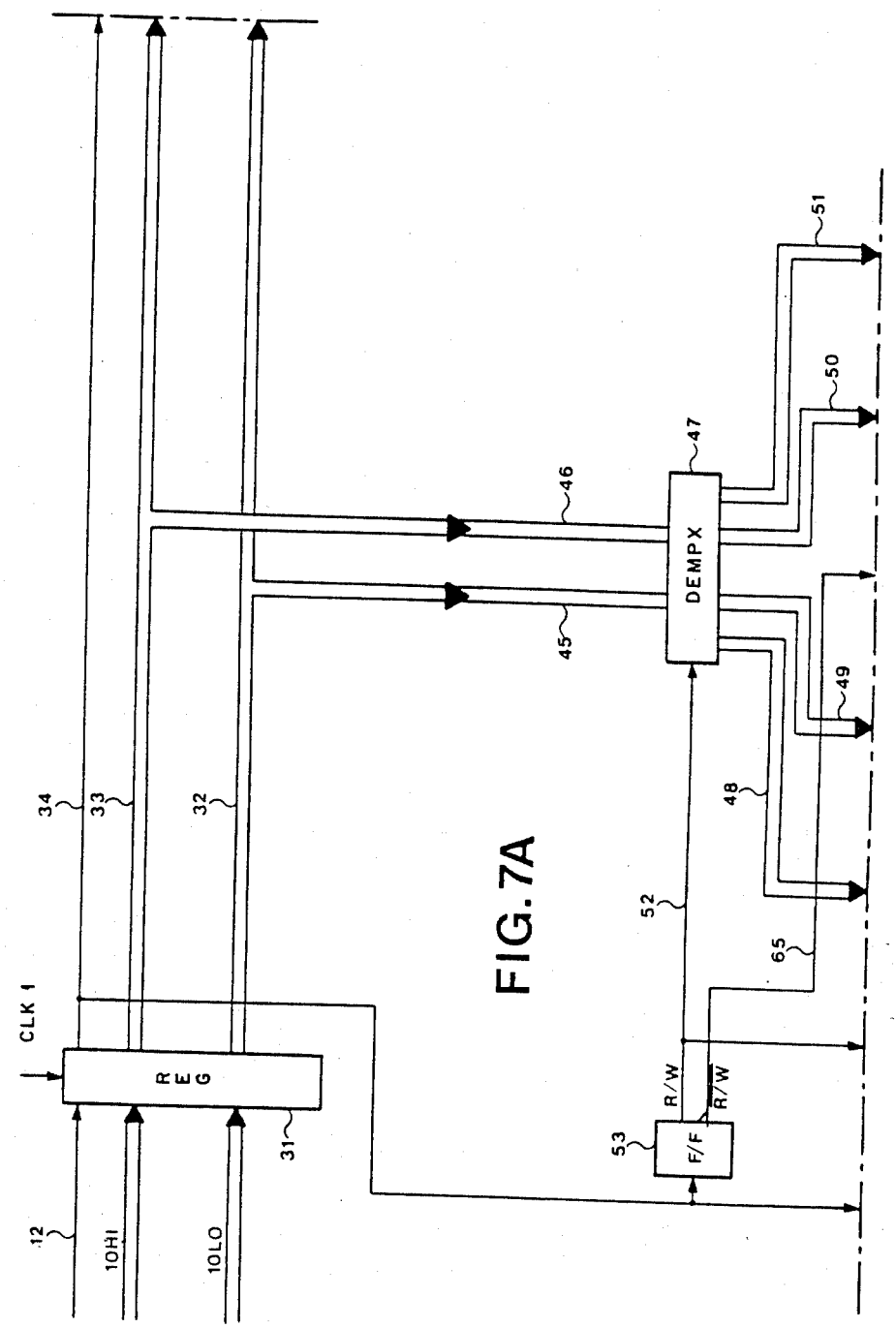
Figure 7C:
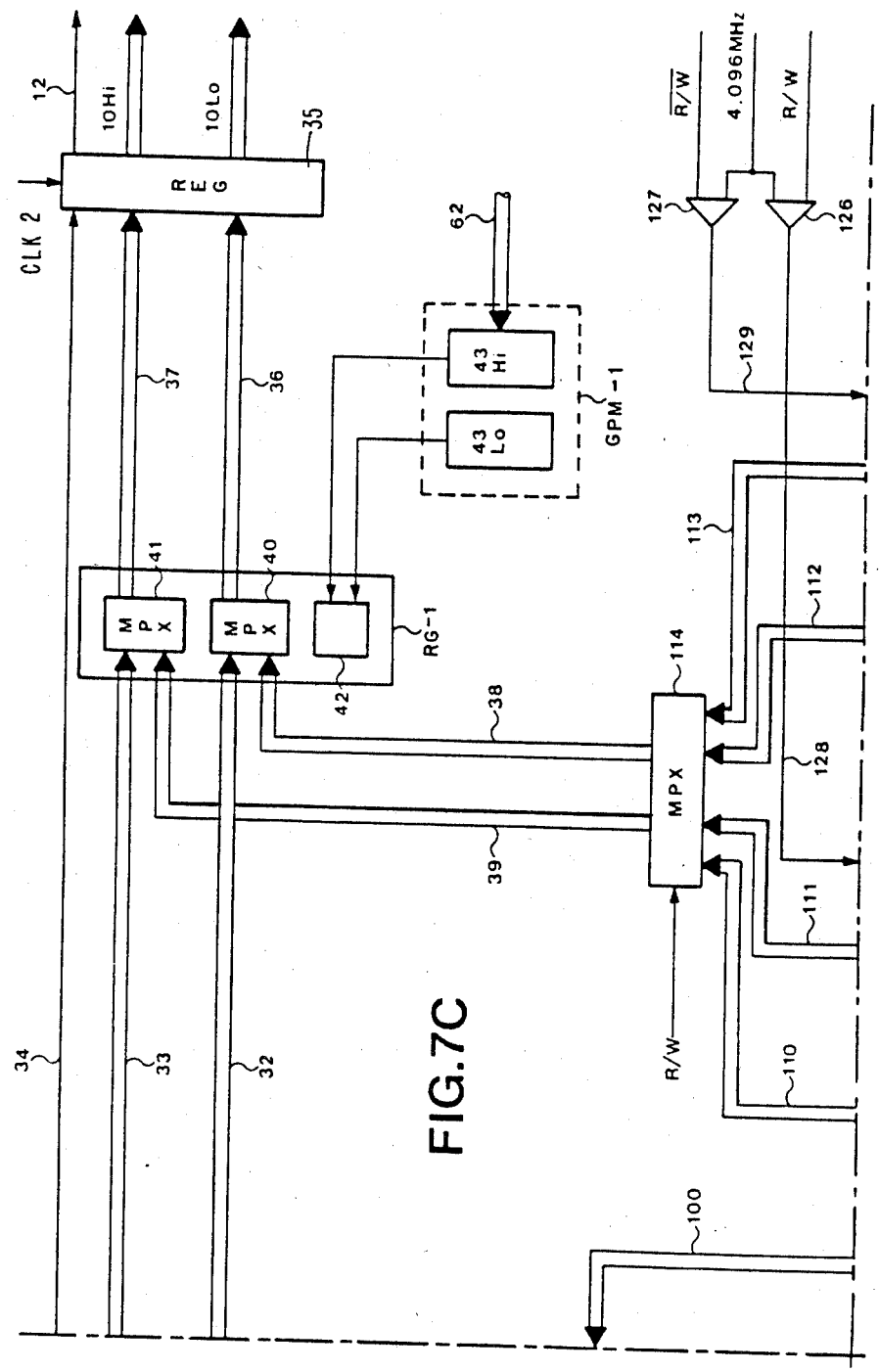
Figure 7D:
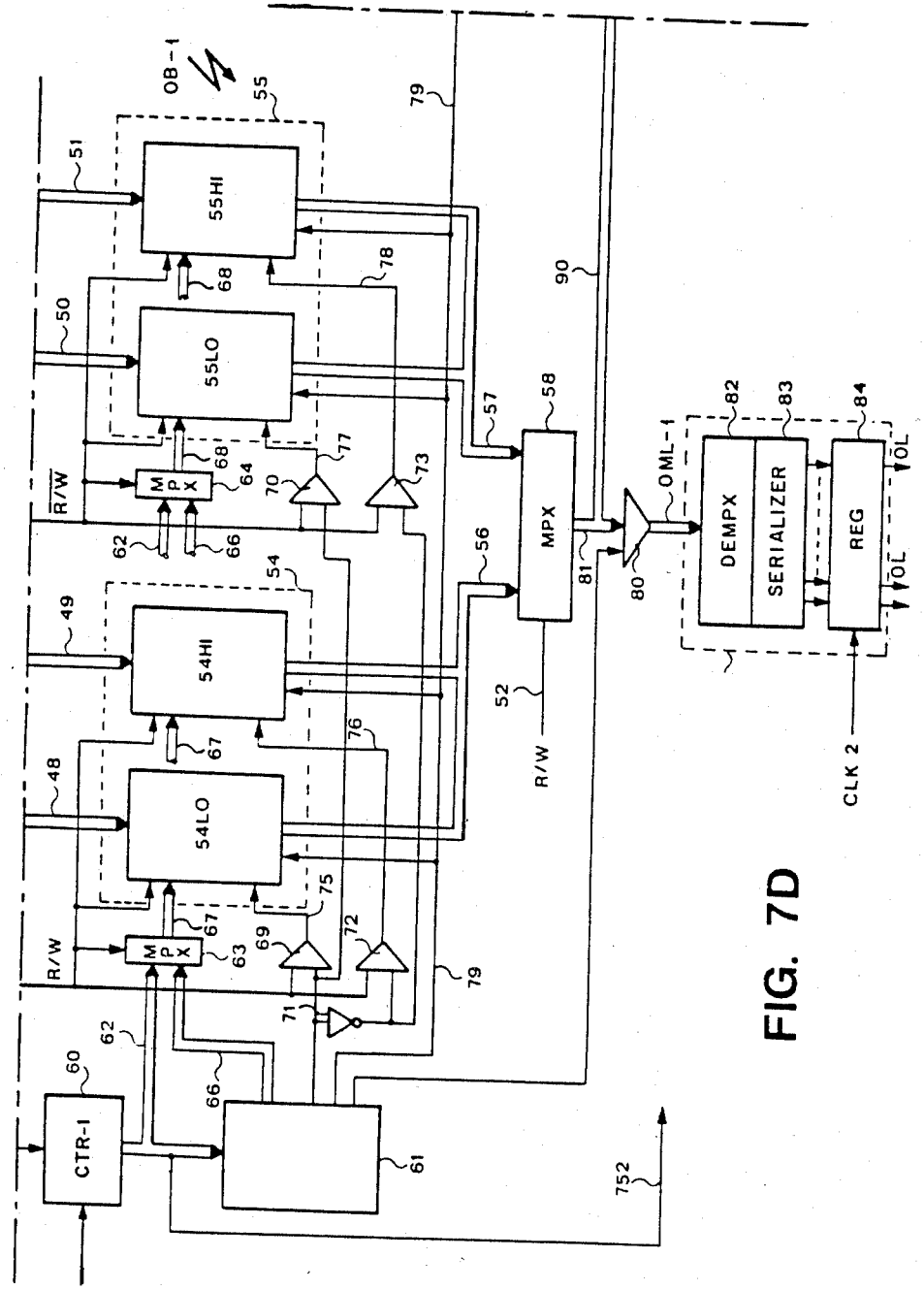
Figure 7E:
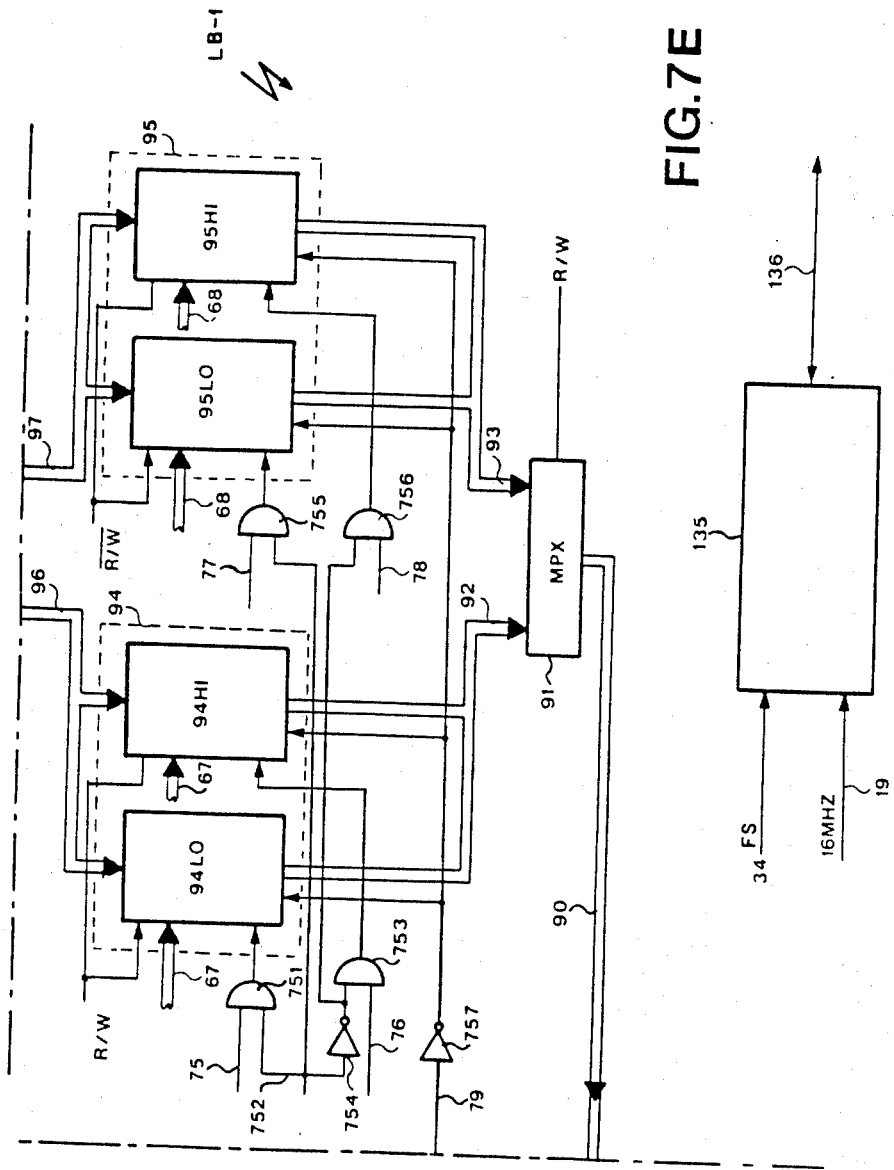

FIG. 6 is a schematic illustration of a unidirectional connection established between two transmitting stations C and B attached to switching modules SM-2 and SM-N, respectively, and a single receiving station attached to switching module SM-1, this type of connection being termed "in-casting" hereinafter. It will be assumed that channels 100, 60, and 50 of links OML-1, IML-2 and IML-N are respectively allocated to stations A, C and B, and that exchange channel 15 is allocated to the connection. Ring gates RG-1, RG-2 and RG-N are controlled as shown. Address "15" is written into storage location 100 of output pointer memory OPM-1, into location 60 of input pointer memory IPM2, and into location 50 of input pointer memory IPM-N. Stations C and D are not allowed to transmit simultaneously. The 8-bit byte from station C is transferred to station A via channel 60 of input link IML-2, input buffer IB-2, exchange channel 15, output buffer OB-1, and channel 100 of output link OML-1. The byte from station B is similarly transferred to station A. The detailed operation of the ring gates will be described later with reference to FIG. 7.

MULTIPOINT CONNECTIONS

A bidirectional multipoint connection can be established by combining the "broadcasting" and "in-casting" connections just described.

LOOP CONNECTIONS

It will be apparent to those skilled in the art that loop connections can readily be established between a number of stations by means of successive unidirectional connections between pairs of stations, using e.g. from A to B, then from B to C, then from C to D, and so forth, using always the same exchange channel.

FIG. 7, which is comprised of FIGS. 7A–7F, is a detailed block diagram of a switching module, for example SM-1, in accordance with the invention. In the embodiment shown in this figure, ring 10 carries two parallel exchange channels and consists of a 16-conductor bus capable of transferring two 8-bit bytes simultaneously and in parallel. For clarity, this bus is shown in FIG. 7 as two 8-conductor buses designated 10LO and 10HI. Each 125-microsecond frame is divided up into 256 time intervals called exchange time slots during each of which each bus 10LO, 10HI carries an exchange channel one 8-bit byte wide. Thus, the two buses 10LO and 10HI are equivalent to one bus operating in the time-division multiplexing mode with 125-microsecond frames comprising 512 exchange channels each. The advantage of using two parallel buses as in the arrangement just described is that it reduces the bit rate on each conductor to 2.048 Mbps and the duration of an exchange time slot to 488 nanoseconds.

The signals on buses 10LO, 10HI and synchronization line 12 upstream of the switching module are applied to a 17-stage input register 31 under the control of a 2.048 MHz timing signal CLK1. The outputs of register 31 that correspond to buses 10LO and 10HI are respectively connected to two 8-conductor buses 32 and 33 which are in turn connected to ring gate RG-1. The output of register 31 that corresponds to synchronization line 12 is connected by a line 34 to one of the seventeen inputs of an output register 35, which also receives as inputs two 8-conductor buses 36 and 37 connected to the output of ring gate RG-1. The signals on line 34 and buses 36, 37 are applied to register 35 under the control of a 2.048 MHz timing signal CLK2. The outputs of register 35 that correspond to line 34 and buses 36, 37 are respectively connected to synchronization line 12, and to buses 10LO, 10HI downstream of the switching module.

Ring gate RG-1, which also receives as inputs two 8-conductor buses 38 and 39, is mainly comprised of two multiplexers 40 and 41. Multiplexer 40 selectively connects either of input buses 32 and 38 to output bus 36, while multiplexer 41 selectively connects either of input buses 33 and 39 to output bus 37. Ring gate RG-1 further includes an arrangement of logic gates 42 which controls multiplexers 40 and 41 as a function of the contents of buses 32, 33, 38, 39 and of the logic value of two gate pointers designated L0 and HI, as will be explained later.

The LO and HI gate pointers are contained in gate pointer memory GPM-1 (FIG. 2) comprised of two storage modules of 256×1 bits each, labeled 43LO and 43HI, that respectively store the LO and HI gate pointers corresponding to the exchange channels on buses 10LO and 10HI. The LO and HI gate pointers read from memory GPM-1 are fed to the arrangement of logic gates 42.

Buses 32 and 33 are further connected by two buses 45 and 46, respectively, to the input of a demultiplexer 47 which operates to selectively couple buses 45, 46 to a pair of buses 48, 49 or to another pair of buses 50, 51 under control of a R/W signal received as input via a line 52. Line 52 is connected to the "true" output of a flip-flop 53 which receives as input the frame synchronizing (FS) signal via line 34. The two pairs of buses 48, 49 and 50, 51 are connected to output buffer OB-1 (FIG. 2) which comprises two buffers 54 and 55 operating in a so-called flip-flop mode to be explained later. Buffers 54 and 55 are comprised of two storage modules each, designated 54LO, 54HI and 55LO, 55HI, respectively, and storing 256×8 bits each. Buses 48, 49, 50, 51 are respectively connected to the Data inputs of modules 54LO, 54HI, 55LO, 55HI. The Data outputs of modules 54LO and 54HI are connected to each other and to an 8-conductor bus 56. The Data outputs of modules 55LO and 55HI are connected to each other and to an 8-conductor bus 57. Buses 56 and 57 are in turn connected to a multiplexer 58 controlled by the R/W signal present on line 52. The R/W signal is applied to the Read/Write inputs of modules 54LO and 54HI, while the R/W signal obtained at the "complement" output of flip-flop 53 is applied to the Read/Write inputs of modules 55LO and 55HI.

Output buffer OB-1 is addressed by a time slot counter CTR-1 60 and by a pointer memory 61 that combines the functions performed by pointer memories OPM-1 and LPM-1 of FIGS. 2 and 3. Counter 60 is a nine-stage counter which operates to count 4.096 MHz timing pulses and thus define $2^9 = 512$ time intervals of 244 nanoseconds each. Counter 60 is actuated in synchronism with the FS signal present on line 34, which forces the contents of counter 60 to go to 247 whenever applied thereto, for reasons to be described later with reference to FIG. 8. The eight most significant bits of counter 60 are applied via a bus 62 to a couple of multiplexers 63 and 64 respectively controlled by the R/W and R/W signals. The nine bits of counter 60 are used to address pointer memory 61 which comprises 512 storage locations capable each of storing an 11-bit output/local pointer consisting of:

8 Address bits
1 LO/HI bit
1 Local bit
1 Output Marker bit

The eight Address bits read out of pointer memory 61 are applied via a bus 66 to the other input of multiplexer 63, whose output is connected by a bus 67 to the Address inputs of modules 54LO and 54HI, and to the other input of multiplexer 64 whose output is connected by a bus 68 to the Address inputs of modules 55LO and 55HI. The LO/HI bit read from pointer memory 61 is applied to one input of an AND gate 69 whose other input receives the R/W signal. This bit is further applied to one input of an AND gate 70 whose other input receives the R/W signal, and to an inverter 71. The output from inverter 71 is applied to one input of an AND gate 72 whose other input receives the R/W signal, and to one input of an AND gate 73 whose other input receives the R/W signal. The outputs from AND gates 69, 72, 70 and 73 are respectively applied to the Select inputs of storage modules 54LO, 54HI, 55LO and 55HI via lines 75, 76, 77 and 78, respectively. The Local bit read from pointer memory 61 is applied via a line 79 to the Data Output Gates of modules 54LO, 54HI, 55LO and 55HI. The Output Marker bit read from memory 61 is applied to a gate 80 as one input thereto. Gate 80 also receives the output from multiplexer 58 as a second input via a bus 81. The output of gate 80 is connected to an 8-conductor bus forming the output multiplex link OML-1 of FIG. 2.

Bus OML-1 is connected to output adapter ADAPT OUT (FIG. 2) comprising a demultiplexer 82, a 16-output serializer 83 and a 16-stage register 84. The sixteen outputs from serializer 83 are loaded into register 84 under control of the CLK2 timing signal. The sixteen outputs of register 84 are connected to the sixteen output interface links OL (FIG. 2). Device 82 demultiplexes the 512 channels on bus OML-1 into sixteen 32-channel links, and is conventionally comprised of a 16-position switch controlled by a 4.096 MHz timing signal, each of which positions enables the contents of bus OML-1 to be loaded in parallel into an 8-stage register. The contents of the sixteen registers of demultiplexer 82 are loaded sequentially and in parallel at a rate of 256 KHz into the sixteen shift registers of deserializer 83, the contents of each of which are then transferred serially at a rate of 2.048 MHz onto the corresponding output interface link OL. The relationship between the channels of bus OML-1 and those of links OL is shown in Table I below.

TABLE I

| OML-1 | ! 0 ! 1 ! 2 ! ... ! 15 ! 16 ! ... ! 510 ! 511 ! |
| Channel No | ! ! ! ! ! ! ! ! ! |
| OL | ! 0 ! 0 ! 0 ! ... ! 0 ! 1 ! ... ! 31 ! 31 ! |
| Channel No | ! ! ! ! ! ! ! ! ! |
| OL No | ! 1 ! 2 ! 3 ! ... ! 16 ! 1 ! ... ! 15 ! 16 ! |

Bus 81 is connected by means of a bus 90 to the output of a multiplexer 91 whose inputs are connected to a couple of buses 92 and 93 and which operates under control of the R/W signal. Buses 92 and 93 are connected to the output of local buffer LB-1, which is similar to output buffer OB-1 and comprises two buffers 94 and 95 operating in the flip-flop mode, each of which includes two storage modules, designated 94LO, 94HI, 95LO, and 95HI, storing 256×8 bits each. Bus 92 is connected to the Data output of modules 94LO and 94HI while bus 93 is connected to the Data output of modules 95LO and 95HI. The Data inputs of modules 95LO and 95HI are connected to each other as well as to a bus 96. The Data inputs of modules 94LO and 94HI are connected to each other as well as to a bus 97. Buses 96 and 97 are connected to the outputs of a demultiplexer 98 operating under control of the R/W signal. The R/W signal is applied to the Read/Write inputs of modules 94LO and 94HI via line 52 while the R/W signal is applied to the Read/Write inputs of modules 95LO and 95HI via line 65. Bus 67 is connected to the Address inputs of modules 94LO and 94HI, while bus 68 is connected to the Address inputs of modules 95LO and 95HI. The output from an OR gate 751 is applied to the Select input of module 94LO OR gate 751 receives as inputs the logic level present on line 75 and the least significant bit of the count of counter 60 that is applied thereto via a line 752. The Select input of module 94HI receives the output from an OR gate 753, which receives as inputs the logic level present on line 76 and that present on line 752 as inverted by an inverter 754. The output from an OR gate 755, which receives as inputs the logic levels on lines 77 and 752, is applied to the Select input of module 95LO. The Select input of module 95HI is supplied with the output from an OR gate 756, which receives as inputs the logic level on line 78 and the output from inverter 754. The Data Output Gate inputs of modules 94LO, 94HI, 95LO and 95HI are connected to the output of an inverter 757 which receives as input the logic level on line 79.

Demultiplexer 98 has its input connected by a bus 100 to an 8-conductor bus constituting the input multiplex link IML-1 of FIG. 2. Bus IML-1 is connected through a demultiplexer 101 to input buffer IB-1, which is similar to buffers LB-1 and OB-1. Buffer IB-1 is comprised of two buffers 102 and 103, each of which includes two storage modules storing 256×8 bits each. These modules are designated 102LO, 102HI, 103LO and 103HI. A bus 10 connects a first output of demultiplexer 101 to an AND gate 105 whose output is connected by a bus 106 to the Data inputs of storage modules 102LO and 102HI. A bus 107 connects a second output of demultiplexer 101 to an AND gate 108 whose output is connected by a bus 109 to the Data inputs of storage modules 103LO and 103HI. The Data outputs of modules 102LO, 102HI, 103LO and 103HI are respectively connected via buses 110, 111, 112 and 113 to a multiplexer 114 which is controlled by the R/W signal and whose output is connected to buses 38 and 39.

Input buffer IB-1 is addressed by the time slot counter 60 and the input pointer memory IPM-1. Memory IPM-1 comprises 512 storage locations each of which can store a 10-bit input pointer consisting of:

8 Address bits,
1 LO/HI bit, and
1 Input Marker bit

Input pointer memory IPM-1 is addressed by means of the nine bits received from counter 60 via a bus 115. The eight Address bits read out of memory IPM-1 are supplied via a bus 116 to a couple of multiplexers 117 and 118 that also receive the count of counter 60 via bus 62 and operate under the control of the R/W and R/W signals, respectively. The output from multiplexer 117 is applied via a bus 119 to the Address inputs of storage modules 102LO and 102HI, and the output from multiplexer 118 is applied via a bus 120 to the Address inputs of storage modules 103LO and 103HI. The LO/HI bit read out of input pointer memory IPM-1 is applied as one input to a couple of AND gates 121 and 122 which receive as a second input the $\overline{R/W}$ and R/W signals, respectively. The LO/HI bit is also applied to an inverter 123 whose output is coupled as one input to a pair of AND gates 124 and 125 which also receive as a second input the $\overline{R/W}$ and R/W signals, respectively. The outputs from and gates 121–125 are respectively applied to the Select inputs of storage modules 102LO, 102HI, 103LO and 103HI. Input buffer IB-1 is provided with a conventional device that resets to zero the storage locations after the contents thereof have been read out. This device includes an AND gate 126, which receives as inputs the R/W signal and the 4.096 MHz timing signal, and an AND gate 127, which receives as inputs the same timing signal and the $\overline{R/W}$ signal. The output of AND gate 126 is connected via a line 128 to the Read/-Write inputs of storage modules 102LO and 102HI, while the output of AND gate 127 is connected via a line 129 to the Read/Write inputs of modules 103LO and 103HI. The Input Marker bit read out of pointer memory IPM-1 is applied as one input via a line 130 to AND gates 105 and 108 which receive as a second input the $\overline{R/W}$ and R/W signals, respectively.

Bus IML-1 is connected to the output of input adapter ADAPT IN (FIG. 2), which is similar to output adapter ADAPT OUT and includes a multiplexer 131 and a deserializer 132 the sixteen inputs of which are supplied with the sixteen outputs of a register 133 under control of the CLK2 timing signal. The inputs of register 133 are connected to the sixteen input interface links IL (FIG. 2).

Pointer memories 61, IPM-1, and GPM-1 are written into under control of a control and timing device 135 to be described later with reference to FIG. 10. Device 135 receives the frame synchronizing (FS) signal via line 34 and the 16.384 MHz timing signal via line 19 and is connected to controller 20 by means of a bidirectional link 136.

The operation of the switching module SM-1 of FIG. 7 will now be described. The switching module performs four main functions, which are:
to intercept exchange channels,
to establish input connections,
to establish output connections,
to establish local connections.

INTERCEPTION OF EXCHANGE CHANNELS

Figure 8:
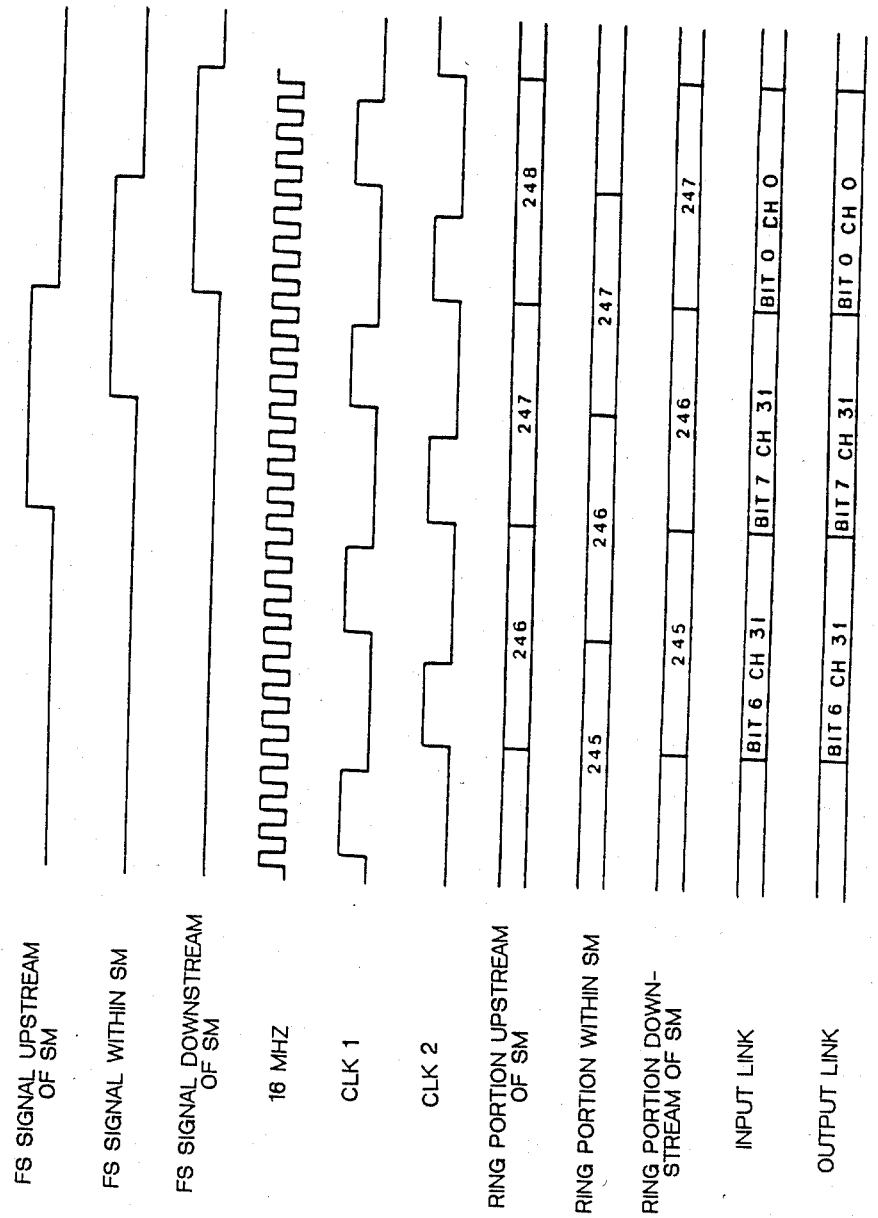
FIG. 8 is a timing diagram depicting the operation of the switching module of FIG. 7.

Before describing this function, the manner in which exchange channels circulate on the ring will be described with reference to the timing diagram of FIG. 8. The CLK1 and CLK2 timing signals both have a frequency of 2.048 MHz, with CLK2 being delayed by half a period with respect to CLK1. The two exchange channels, say channels 246, present on buses 10H1 and 10LO upstream of switching module SM-1 are applied thereto (i.e. to the input of register 31) during the time interval defined by the CLK2 signal associated with the immediately preceding switching module. The contents of exchange channels 246 are loaded into register 31 at the next positive-going transition of the CLK1 signal and remain therein until the next position-going transition of CLK1 that is, throughout the duration of an exchange time. The contents of register 31 (ignoring for the moment the action of ring gate RG-1) are loaded into register 35 and will thus be sent over the downstream portion of the ring at the next positive-going transition of the CLK2 signal. Thus, the switching module introduces a delay equal to one exchange time slot in the propagation of the exchange channels around the ring. To compensate for this delay, the frame synchronizing signal on line 12 is caused to be delayed by an equivalent time interval through the use of registers 31 and 35.

The frames on the ring are synchronized with those on the input and output interface links and on the input and output multiplex links. To achieve synchronism at the input and output interface links (that is, to ensure that, for example, channel 31 is present on the output interface link at the same time as channel 31 on the corresponding input interface link is present thereon) and to take into account the delay introduced by the processing of a channel in the switching module, the frame synchronizing (FS) signal occurs during exchange time slot 247 rather than during exchange time slot 0. This is the reason why the FS signal forces counter 60 to go to the count of 247 instead of resetting counter 60 to zero.

Exchange channel interceptions in switching module SM-1 are carried out by ring gate RG-1, which is controlled by the gate pointers stored in pointer memory GPM-1. Memory GPM-1 is addressed by the eight most significant bits of counter 60 which sequentially provide 256 individual addresses at the rate of one address every 488 nanoseconds, i.e. at the rate at which the exchange time slots are provided. Counter 60 is synchronized with the loading of the contents of the exchange channels into register 31 under control of the FS signal. The address supplied by counter 60 is applied in parallel to storage modules 43LO and 43HI so that during each exchange time slot pointer memory GPM-1 can simultaneously provide the LO and HI gate pointers corresponding to the exchange channels on buses 32 and 33. The LO and HI gate pointers control ring gate RG-1 as shown in Table II below. For example, if LO gate pointer 246 is set to "1", indicating that exchange channel 246 on the LO bus is to be intercepted, then, during exchange time slot 246, multiplexer 40 disconnects bus 32 from bus 36 and connects bus 38 to bus 36. The contents of bus 38 are thus placed onto LO exchange channel 246 for transfer to the ring downstream of switching module SM-1. If LO gate pointer 246 is set to "0", then the operation of ring gate RG-1 is dependent upon the contents of exchange channel 246 on bus 32 and those of bus 38, as shown in Table II below.

TABLE II

| LO Gate Pointer (HI Gate Pointer) | Contents of bus 32 (contents of bus 33) | Contents of bus 38 (contents of bus 39) | Connection |
|---|---|---|---|
| 1 | Zero or non zero | Zero or non zero | 38–36 (39–37) |
| 0 | Zero | Zero | 32–36 (33–37) |
| 0 | Non Zero | Zero | 32–36 (33–37) |
| 0 | Zero | Non Zero | 38–36 (39–37) |
| 0 | Non Zero | Non Zero | 32–36 (33–47) |

In a simplified embodiment, the ring gate could operate in a binary mode, regardless of the contents of the buses, in which case the logic gates 42 would be eliminated and the gate pointers would directly control multiplexers 40 and 41. In the embodiment shown in FIG. 7, the logic gates 42 whose operation is illustrated in Table II enable the network to establish an "in-cast" type of connection as described earlier and allow the system to detect certain error conditions. To establish an "in-cast" connection such as that illustrated by way of example in FIG. 6, ring gate RG-2, associated with the first transmitting station on the loop, is controlled so as to enable exchange channel 15 to be intercepted, with the corresponding gate pointer being set to "1". Ring gate RG-N, associated with station B, must be controlled in such a way that, if station C is transmitting an 8-bit byte while station B is not transmitting, ring gate RG-N will be transparent to exchange channel 15, while in the converse situation ring gate RG-N will intercept exchange channel 15. Control of the ring gate in both of the above situations would be as shown in rows 2 and 4 of Table II. If station B attempts to transmit a byte over exchange channel 15 while the latter is busy, priority will be given to the original contents of channel 15, as shown in the last row of Table II, and an error condition will be reported to controller 20.

INPUT CONNECTIONS

An input connection allows an 8-bit byte from a channel on any one of the input interface links IL to be transferred to anyone of the exchange channels on the ring. This is achieved through the use of input buffer IB-1. The 512 channels of the input multiplex link, which are obtained by multiplexing the channels of the input interface links, are stored in input buffer IB-1 at the addresses specified by the input pointers, and the contents of the buffer are sequentially read out thereof under control of time slot counter 60. In practice, either of buffers 102 and 103 is written into throughout the duration of a frame while the contents of the other buffer are read out and sent over the ring, then the buffer just written into is read out, and so on. This mode of operation is termed "flip-flop mode" hereinafter.

Assume that during a given frame, say frame n, buffer 102 is being written into while the contents of buffer 103 are being read out. Throughout the duration of frame n, the R/W signal obtained at the true output of latch 53 is low, and demultiplexer 101 connects bus IML-1 to bus 104 while multiplexer 114 connects buses 112, 113 to buses 38, 39 and multiplexer 117 connects the output of input pointer memory IPM-1 to the Address inputs of storage modules 102LO and 102HI. As the R/W signal is low, the output from AND gate 126 is forced to go low, thereby setting storage modules 102LO and 102HI to the Write mode. The R/W signal is high and enables AND gates 105, 121, and 124. The contents of the channels on bus IML-1 are stored in module 102LO as explained in the following example. Assume that the contents of channel 46 on bus IML-1 are to be transferred to exchange channel 65 on the HI bus. When channel 46 occurs on bus IML-1, the count defined by the nine bits of counter 60 is equal to "46" and the input pointer stored in the 46th location of the pointer memory is fetched therefrom. This input pointer has the following configuration:

| Address Bits | LO/HI Bit | Marker Bit |
|---|---|---|
| 01000001 | 1 | 1 or 0 |

The Address field specifies the address "65" which is applied to storage modules 102LO and 102HI. Since the LO/HI bit is "1" and is inverted by inverter 123, the Select input of module 102HI is forced to go low, thereby selecting this module. Module 102LO is not selected. If the Marker bit is "1", AND gate 105 is enabled and the contents of channel 46 on bus IML-1 are loaded into location 65 of module 102HI. If the Marker bit is "0", AND gate 105 is inhibited and an all-zero byte is loaded in this storage location.

During frame N+1, the R/W signal is high, demultiplexer 101 connects bus IML-1 to bus 107, multiplexer 114 connects buses 110, 111 to buses 38, 39, and multiplexer 117 connects bus 62, whose contents consist of the eight most significant bits of the count of counter 60, to the Address inputs of storage modules 102LO and 102HI. The R/W signal is low and selects both modules through AND gates 121 and 124. The contents of modules 102LO and 102HI are simultaneously and sequentially read out under control of the eight most significant bits of the count of counter 60, the contents of storage locations 0 of the LO and HI modules are placed on exchange channels O and the LO and HI buses, this being followed by the contents of location 1, and so forth. After being read out, each storage location is reset to zero as explained earlier. Throughout the duration of frame n+1, the R/W signal is high. During a given exchange time slot, the 4.096 MHz timing signal is successively high and low. During the first half of an exchange time slot, the output from AND gate 126 is high, thereby setting storage modules 102LO and 102HI to the Read mode. During the second half of this time slot, the output from AND gate 126 is low, thereby setting modules 102LO and 102HI to the Read mode. During the second half of this time slot, the output from AND gate 126 is low, thereby setting modules 102LO and 102HI to the Write mode, the R/W signal is low, thereby forcing the output from AND gate 105 to go low, and an all-zero byte is written into the addressed storage locations that have just been read out.

OUTPUT CONNECTIONS

An output connection enables the contents of any exchange channel on the ring to be transferred to a channel on any one of the output interface links OL. The contents of the exchange channels are loaded in output buffer OB-1 under control of time slot counter 60 and the contents of output buffer OB-1 are read out under control of the output/local pointers stored in pointer memory 61. In practice, output buffer OB-1 is comprised of two buffers that operate in the flip-flop mode in the same manner as those comprising input buffer IB-1.

Assume that during frame n, buffer 54 is written into while the contents of buffer 55 are read out. The R/W signal is low, demultiplexer 47 connects buses 45, 46 to buses 48, 49, multiplexer 58 connects bus 57 to bus 81, and multiplexer 63 connects bus 62 to bus 67, which is itself connected to the Address inputs of storage modules 54LO and 54HI. Since the R/W signal is low, the effect of this signal is to place these modules in the Write mode and to select them through AND gates 69 and 72. Modules 54LO and 54HI are simultaneously and sequentially written into under control of counter 60, the contents of exchange channels O on buses 32 and 33 are stored in storage locations 0 of modules 54HO and 54HI, the contents of exchange channels 1 are stored in storage locations 1 of modules 54HO and 54HI, and so on.

During frame N+1, the R/W signal is high, multiplexer 58 connects bus 56 to bus 81, demultiplexer 47 connects buses 45, 46 to buses 50, 51, and multiplexer 63 connects bus 66 to 67, itself connected to the Address inputs of modules 54LO and 54HI. Since the R/W signal is high, storage modules 54LO and 54HI are set to the Read mode of operation and the contents thereof are read out as follows. Assume that the contents of exchange channel 45 on the LO bus, which were stored in storage location 45 of module 54LO, are to be transferred to channel 300 of bus OML-1. When counter 60 reaches the count of 300, the output/local pointer stored in location 300 of pointer memory 61 is read out. This pointer has the following configuration:

| Address Bits | LO/HI Bit | Local Bit | Marker Bit |
|---|---|---|---|
| 00101101 | 0 | 0 | 1 or 0 |

The Address field specifies address "45" and the LO/HI bit specifies module 54LO. Since it is "0", the Local bit enables the Data Output Gates in the storage modules that make up output buffer OB-1. If the Marker bit is "1", AND gate 80 is enabled and the contents of location 45 in module 54LO are placed onto bus OML-1. If the Marker bit is "0", the output from AND gate 80 is forced to zero and an all-zero byte is placed onto bus OML-1.

LOCAL CONNECTIONS

A local connection enables the contents of an exchange channel on any one of the input interface links IL to be transferred to a channel on any one of the output interface links OL. The contents of the 512 channels on bus IML-1 are systemically loaded in the local buffer LB-1 under control of time slot counter 60 and the contents of local buffer LB-1 are read out under control of the output/local pointers. Buffer LB-1 is similar to input and output buffers IB-1 and OB-1 and, consequently, shall not be described in greater detail hereafter.

During frame n, buffer 94 is written into as follows. During the first 488-ns time slot, address 0 is applied via bus 67 to both storage modules 94LO and 94LI. During the first half of this time slot, the least significant bit of the count of counter 60 on line 752 is "0", storage module 94LO alone is selected, and channel 0 on bus IML-1 is loaded in storage location O of module 94LO. During the second half of the time slot, the least significant bit of counter 60 is "1", storage module 94HI alone is selected, and channel 1 on bus IML-1 is loaded in location 0 of module 95HI. This process is repeated throughout the duration of frame n.

During frame n+1, buffer 94 and buffer 54, which forms part of output buffer OB-1, are simultaneously addressed by the output/local pointers, and the Local bit in each output/local pointer determines which of buffers 94 and 54 is to be read out. For example, if channel 120 on bus IML-1 is to be connected to channel 40 on bus OML-1, then the output/local pointer read out of pointer memory 61 will have the following configuration upon counter 60 reaching a count of 40:

| Address Bits | LO/HI Bit | Local Bit | Marker Bit |
|---|---|---|---|
| 00111100 | 0 | 1 | 1 or 0 |

The Address field specifies address "60" and the LO/HI bit specifies module 94LO. As the Local bit on line 79 is "1", the output from module 54LO, which is addressed in parallel with module 94LO, is inhibited and the output from module 94LO is enabled. Accordingly, the contents of storage location 60 of module 94LO, that is, the contents of channel 120 on bus IML-1, are placed onto bus 81. If the Marker bit is "1", AND gate 80 is enabled and bus 81 is connected to bus OML-1. If the Marker bit is "0", the output from AND gate 80 is forced to zero and an all-zero byte is placed on bus OML-1.

Figure 9:
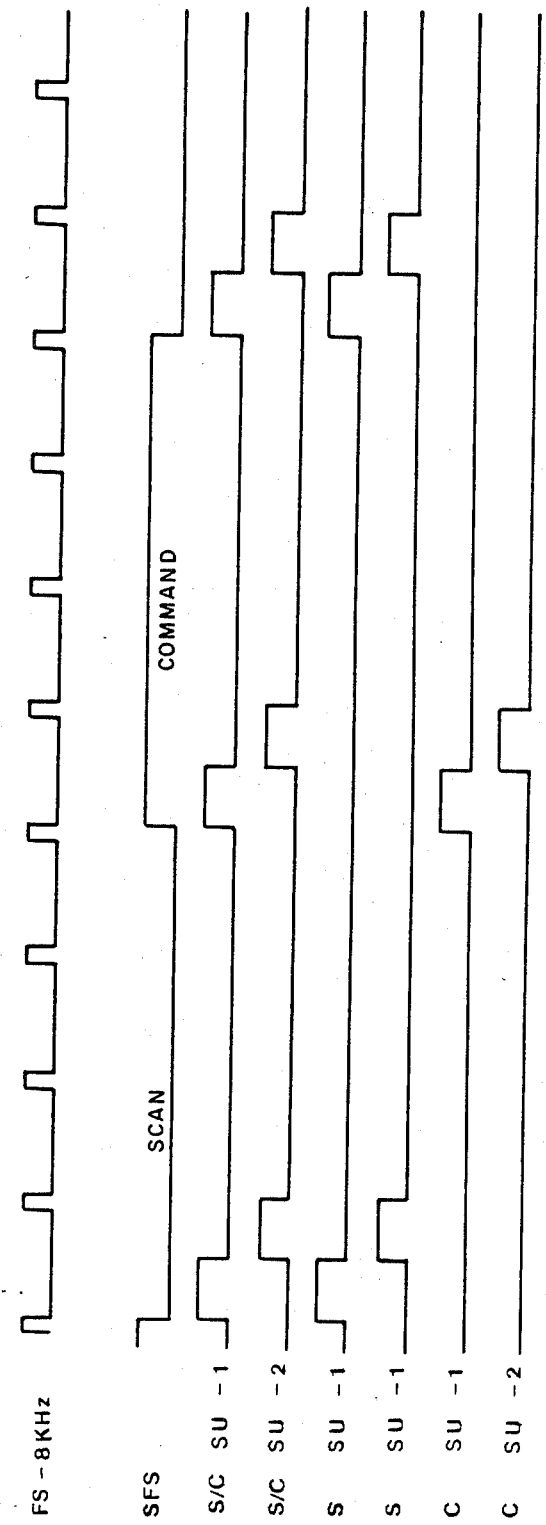
FIG. 9 is a timing diagram depicting the operation of the control device 135 of FIG. 7.

Control and timing device 135 and controller 20 exchange messages over bidirectional link 136 using the well-known "ping-pong" technique. During a so-called Command time interval, controller 20 sends a Command message to device 135, and during a so-called Scan time interval, device 135 sends a Scan message to controller 20. In the exemplary embodiment shown in FIG. 10, the time available is divided into recurrent 1-microsecond superframes, each of which consists of one 500-microsecond Scan time interval and one 500-microsecond Command time interval. Link 136 is common to eight switching modules, that is, to eight devices 135, and each Scan and Command time interval is divided into eight time intervals respectively allotted to eight switching modules. The timing diagram of FIG. 9 illustrates the operation of link 136. The superframes are defined by a superframe synchronizing (SFS) signal and the Scan and Command time intervals are respectively defined by low and high levels of the SFS signal. In FIG. 9, the signals labeled S/C Su-1 and S/C SU-2 define the time intervals respectively allotted to switching units SU-1 and SU-2, while the signals labeled S SU-1, S SU-2, C SU-1 and C SU-2 define the time intervals respectively allotted to switching units SU-1 and SU-2 for processing the Scan and Command messages. These messages comprise eight 8-bit bytes each, bringing the bit rate on link 136 to 1.024 Mbps.

| COMMAND MESSAGE FORMAT | |
|---|---|
| Byte 0 | |
| Bits 0–3 | Bidirectional link number, not checked in device 135. |
| Bits 4–6 | Switching Module address |
| Bit 7 | Always set to "1". |
| Byte 1 | |
| | Not used |
| Byte 2 | |
| Bit 0 | Not used |
| Bits 1–4 | Command field |

The table below illustrates some typical commands.

| Bits | 1 | 2 | 3 | 4 | |
|---|---|---|---|---|---|
| | 0 | 0 | 0 | 0 | Invalid Command |
| | 0 | 0 | 0 | 1 | Write Input Pointers |
| | 0 | 0 | 1 | 0 | Read Output Pointers |
| | 0 | 1 | 0 | 0 | Write Ring Gate Pointers |
| | 1 | 0 | 1 | 1 | Read Input/Output Pointers |
| | 1 | 1 | 0 | 0 | Read Ring Gate Pointers |

| | |
|---|---|
| Bit 5 | Command number. Change in value denotes a new command. |
| Bit 6 | Not used. |
| Bit 7 | Most-significant bit (MSB) of address of |

-continued

| | Input/Output pointers |
|---|---|
| Byte 3 | |
| Bits 0-7 | Address of Input/Output Pointers |
| Byte 4 | |
| Bit 0 | Input/Output Marker bit |
| Bit 1 | Local bit |
| Bit 2 | Ring Gate Intercept |
| Bits 3-6 | Not used |
| Bit 7 | LO/HI bit |
| Byte 5 | |
| Bits 0-7 | Pointer Data (exchange channel address) |
| Bytes 6 and 7 | |
| | Not used. |

| SCAN MESSAGE FORMAT | |
|---|---|
| Byte 0 | |
| Bit 0 | Set to "1" if module address is correct. |
| Bits 1-4 | Link Address Readback |
| Bits 5-7 | Module Address Readback |
| Byte 1 | |
| Bit 0 | Last Command Number |
| Bit 1 | Invalid Command |
| Bit 2 | SFS Synch Check |
| Bits 3-6 | Parity check |
| Bit 7 | Switching Module Inhibit |
| Byte 2 | |
| Bit 0 | Always set to "1" |
| Bits 1-4 | Command Readback |
| Bit 5 | Command Number Readback |
| Bit 6 | Not used |
| Bit 7 | MSB of Input/output Pointer Address Readback. |
| Byte 3 | |
| Bits 0-7 | Address Readback |
| Byte 4 | |
| Bit 0 | Input Marker bit |
| Bit 1 | Not used |
| Bit 2 | Ring Gate Intercept bit |
| Bits 3-6 | Not used |
| Bit 7 | LO/HI bit |
| Byte 5 | |
| Bits 0-7 | Data Readback |
| Byte 6 | |
| Bit 0 | Output Marker bit |
| Bit 1 | Local bit |
| Bits 2-6 | Not used |
| Bit 7 | MSB of contents of Output Pointers |
| Byte 7 | |
| Bits 0-7 | Contents of Pointers |

Figure 10:
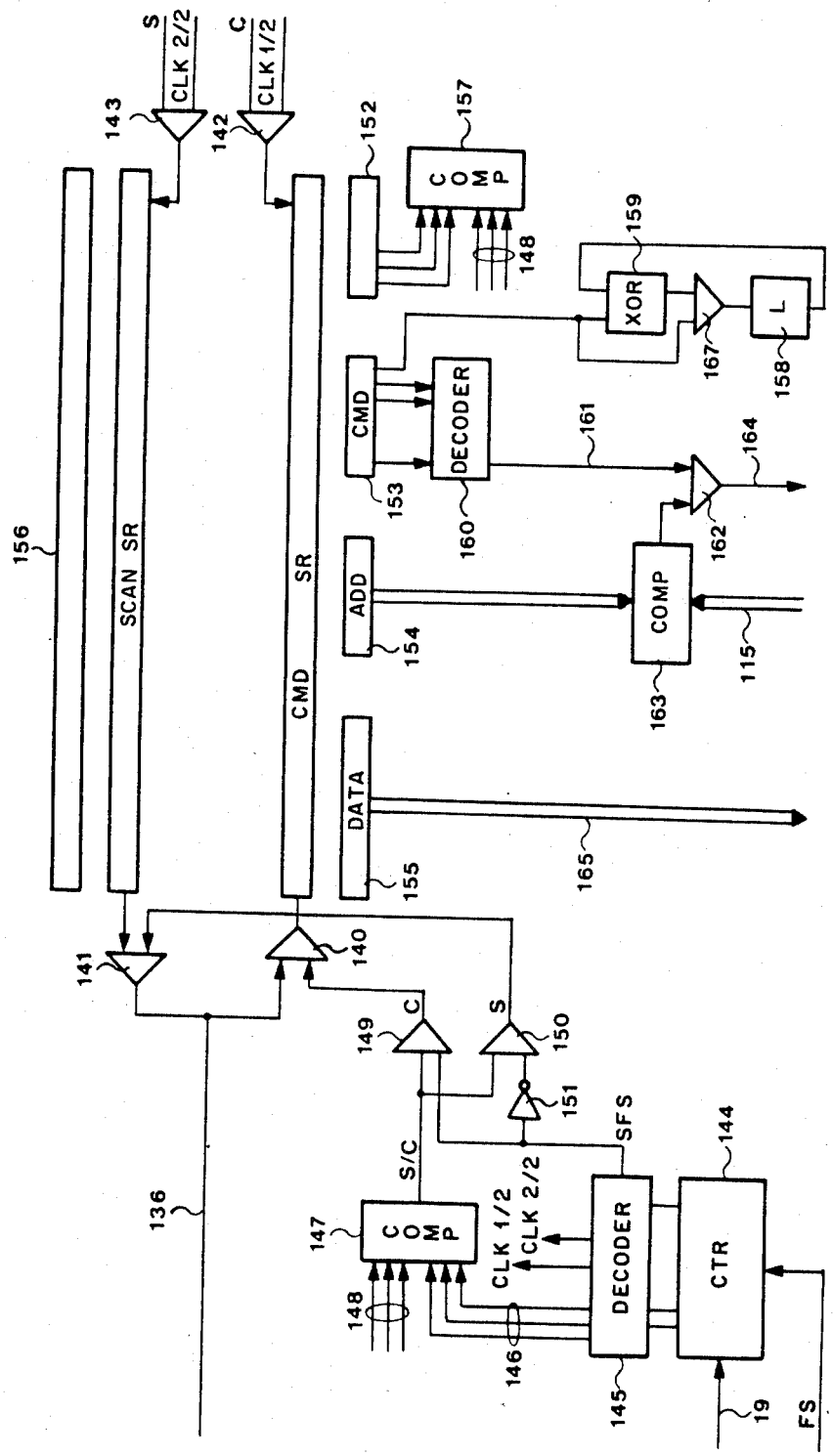
FIG. 10 is a block diagram of the control device 135 of FIG. 7.

Referring now to FIG. 10, there is shown a simplified block diagram of an exemplary embodiment of the control and timing device 135, which uses the Command and Scan messages described earlier.

Bidirectional link 136 is connected to one input of an AND gate 140, the output from which is applied to the serial input of a 64-stage shift register designated CMD SR, and to the output of an AND gate 141, an input of which is connected to the serial output of a 64-stage shift register designated SCAN SR. These shift registers are respectively associated with the Command and Scan messages and controlled by the outputs from a couple of AND gates 142 and 143. The 16.384 MHz timing signal present on line 19 (FIG. 1) is applied to a 14-stage counter 144 which is synchronized with the FS signal. Counter 144 is connected to a decoder 145 which supplies the timing signals required for the operation of the device of FIG. 7, and in particular the SFS, CLK1 and CLK2 signals as well as 1.024 MHz timing signals labeled CLK1/2 and CLK2/2. Decoder 145 has three further outputs connected via lines 146 to a comparator 147, which additionally receives the address of the switching module via three lines 148. The output from comparator 147 is supplied as one input to a couple of AND gates 149 and 150 which receive as a second input the SFS signal and the inverse thereof, provided by an inverter 151, respectively. The output from AND gate 149 is applied to AND gates 140 and 142 while the output from AND gate 150 is applied to AND gates 141 and 143.

Shift register CMD SR is connected to a 7-stage header register 152 which receives bits 0-6 of byte 0 of the Command message, to a 5-stage Command register 153 which receives bits 1-5 of byte 2 of the Command message, to a 9-stage address register 154 which receives bit 7 of byte 2 and all eight bits of byte 3 of the Command message, and to a 12-stage data register 155 which receives bits 0, 1, 2, 7 of byte 4 and all eight bits of byte 5 of the Command message. Shift register SCAN SR is connected to a 64-bit Scan register 156. The superframe synchronizng (SFS) signal is synchronized with the frame synchronizing (FS) signal as shown in FIG. 9. When the SFS signal is up, the outputs from ANDd gates 150 and 141 are forced to zero. The level of the signals on the three address lines 148 is representative of the address of the switching module, which address can take on any one of eight different values. When the address provided by decoder 145 on lines 146 matches that specified on address lines 148, the output from comparator 147 goes up, thereby providing the signal designated S/C SU-1 in FIG. 9. The output from AND gate 149 goes up and remains up for 62.5 microseconds, as illustrated by the C SU-1 signal in FIG. 9. During this time interval, the Command message bits on line 136 are loaded in shift register CMD SR under the control of the CLK1/2 signal, which is a 1.024 Mbps timing signal obtained by halving the CLK1 signal. At the end of said time interval, shift register CMD SR is disconnected from line 136 by AND gate 140 and its contents are transferred to registers 152-155, as previously explained, by means of transfer gates not shown. A time interval of 500−62.5=437.5 microseconds is then available to device 135 for processing the command. Bits 4-6 of byte 0 that are stored in register 152 are compared with the signal levels on address lines 148 by a comparator 157 and if no equality is found, the command is not executed and bit 0 of byte 0 of the Scan message in register 156 is set to "0". If an equality is found, said bit 0 is set "1" and various gates not shown that allow the command to be executed are enabled. The Command Number bit stored in command register 153 is compared with the Command Number bit of the preceding Command message that is stored in a latch 158, by means of Exclusive OR gate 159. If the two bits match, then the command is not executed; otherwise, the Command Number bit is stored in latch 158 and the command is executed. The execution of an Input Pointer Write command will now be described by way of example. A decoder 160 coupled to command register 153 raises a line 161 connected to a NAND gate 162. The address stored in address register 154 is compared in a comparator 163 with the count of time slot counter 60 (FIG. 7) as received via bus 115. If an equality is found, the output from comparator 163 goes up and a down level is produced at the output of NAND gate 162. This down level is applied via line 164 to the Read/Write input of input pointer memory IPM-1 and is used to inhibit the data output gate thereof. Address bits 0-7 of byte 5, and bits 7 and 0 of byte 9, stored in data register 155 are written into memory IPM-1 via a bus 165 at the address specified by counter 60. The contents of Scan register 156 are loaded during execution of the command, and then transferred to shift register SCAN SR by conventional means not shown. When the S SU-1 signal produced by AND gate 150 goes up, the contents of shift register SCAN SR are read out and transferred to link 136 at the rate defined by the CLK2/2 timing signal, which is obtained by halving the CLK2 timing signal. Suitable means of executing the various commands by using the formats of the Command and Scan messages, as illustrated in the above example, are believed to be readily apparent to one skilled in the art.

Figure 11:
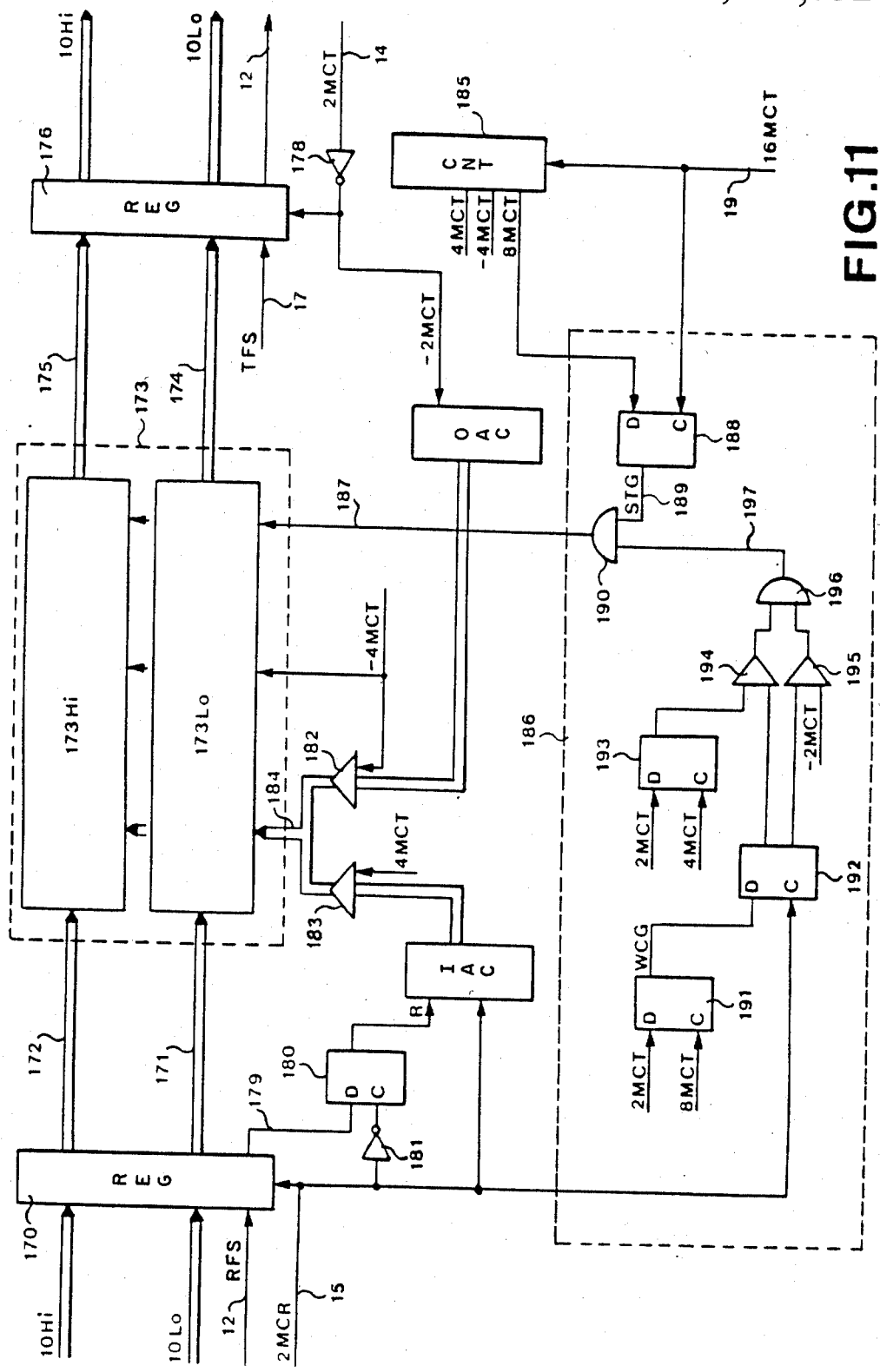
FIG. 11 is a block diagram of the ring control device 11 of FIG. 1.

Referring now to FIG. 11, a detailed block diagram of the ring control device 11 of FIG. 1 is shown. The signals on buses 10HI and 10LO and synchronization loop 12 upstream of device 11 are fed to a 17-stage register 170 under control of the 2.048 MHz timing signal received via that portion of timing signal loop 15 which lies upstream of device 11. This timing signal will be called 2MCR signal hereafter. The outputs from register 170 that correspond to buses 10LO, 10HI are applied via two buses 171, 172 to the Data inputs of two storage modules 173LO and 173HI, storing 256×8 bits each, that comprise a memory 173. The Data outputs of storage modules 173LO and 173HI are applied via two buses 174 and 175 to a 17-stage register 176 which also receives the frame synchronizing signal to be transmitted. This signal supplied by master timing device 13 over a line 17, will be designated TFS hereafter. The outputs of register 176 that correspond to buses 174, 175 and line 17 are respectively connected to those portions of buses 10LO, 10HI and line 12 that lie downstream of device 11. The signals on buses 174, 175 and line 17 are fed to register 176 under control of a timing signal labeled −2MCT, resulting from the inversion by an inverter 178 of the 2.048 MHz timing signal supplied by master timing device 13 over line 14 and designated 2MCT. The output of register 170 that corresponds to frame synchronizing loop 12 is connected via a line 179 to the D input of a D-type flip-flop 180 whose C input receives a signal designated −2MCR that is obtained by inverting the 2MCR signal by means of an inverter 181. The 2MCR signal is applied as an input to an 8-bit input address counter IAC that is reset to zero by the output from flip-flop 180. The −2MCT signal is applied as an input to an output address counter OAC whose output is applied to an AND gate 182. The output from counter IAC is applied to an AND gate 183. The outputs of AND gates 183 and 181 are connected to each other and to a bus 184, itself connected to the Address inputs of storage modules 173LO and 173HI. A 16.384 MHz timing signal designated 16MCT that is applied by master timing device 13 is applied to a counter 185 which derives therefrom a 4.096 MHz signal designated 4MCT, the inverse thereof, designated −4MCT, and a 8.192 MHz signal designated 8MCT. The −4MCT signal is applied to the Read/Write inputs of modules 173LO and 173HI, and to AND gate 182. The 4MCT signal is applied to AND gate 183. The 16MCT, 8MCT, 4MCT, 2MCT, −2MCT and 2MCR signals are applied to a write cycle selection device 186 whose output is connected via a line 187 to the Select inputs of modules 173 LO and 173 HI. In device 186, the 8MCT and 16MCT signals are respectively applied to the D and C inputs of a D-type flip-flop 188 whose "true" output produces a signal labeled STG that is applied via a line 189 to one input of an OR gate 190, whose output is connected to line 187. The 2MCT and 8MCT signals are respectively applied to the D and C inputs of a D-type flip-flop 191 whose "true" output provides a signal designated WCG which is in turn applied to the D input of a D-type Selection flip-flop 192, whose C input receives the 2MCR signal. The 2MCT and 4MCT signals are respectively applied to the D and C inputs of a D-type flip-flop 193 whose "true" output produces a signal labeled QUAD which is fed, together with the "true" output from flip-flop 192, to an AND gate 194. The −2MCT signal and the "complement" output from flip-flop 192 are applied to a AND gate 195. The outputs from AND gates 194 and 195 are coupled to an OR gate 195 whose output is fed to OR gate 190 via line 197.

The main function of ring control device 11 is to ensure that the time taken by the exchange channels to propagate around the ring remains constant and equal to 125 microseconds. Device 11 uses as references the signals generated by master timing device 13, i.e. the 2MCT timing signal and the transmitted frame synchronizing (TFS) signal, and sends the exchange channels down the ring in synchronism with both signals. Device 11 receives the exchange channels from the ring in synchronism with the received 2MCR signal and the received frame synchronizing (RFS) signal. Thus, the function of device 11 is to resynchronize the incoming exchange channels with the reference signals, and to transmit the resynchronized channels over the ring.

Device 11 is organized around buffer 173, which operates as an elastic buffer. The contents of the incoming exchange channels are stored in the buffer at the addresses provided by counter IAC, which operates in synchronism with the received 2MCR signal. The contents of the buffer are read out and transferred to the ring under control of counter QAC, which operates in synchronism with the transmitted −2MCT signal. Since any phase relationship may exist between the transmitted and received timing signals, contentions which may arise between read and write operations are resolved as follows: each exchange time slot (488 ns) is divided into three time intervals, namely, one Buffer Read time interval and two Buffer Write time intervals. The Buffer Write time interval during which the buffer will actually be loaded is selected as a function of the phase relationship between the transmitted and received timing signals. In the embodiment shown in FIG. 11, each exchange time slot is divided for practical reasons into four equal time intervals called "quarter time intervals", namely, two Read time intervals, only one of which is actually used, and two Write time intervals designated WA and WB.

The operation of the device of FIG. 11 will now be described in detail with reference to the timing diagrams shown in FIG. 12. Buffer 173 is addressed only when its Select input is down, and operates in the Read mode or in the Write mode depending on whether its Read/Write input is up or down, respectively.

READ OPERATION

During the first quarter time interval, the −4MCT signal is up, thereby placing buffer 173 in the Read mode, but the QUAD and −2MCT signals are up, forcing the Select input of buffer 173 to an up level which inhibits the buffer. During the third quarter time interval, the −4MCT signal is up, thereby placing buffer 173 in the Read mode and enabling AND gate 182. The QUAD and −2MCT signals are down, forcing line 197 down. When the STG signal on line 189 goes down, buffer 173 is selected by a down level on line 187 and the storage locations addressed by the contents of counter OAC in modules 173LO and 173HI are read out and transferred to buses 171 and 175. The contents of these buses are loaded in output register 176 at the next positive-going transition of the −2MCT signal.

WRITE OPERATION

The selection of either of the second and fourth quarter time intervals for loading the buffer is made by first dividing each exchange time slot into first and second equal time intervals termed "wait times" that respectively include the second and fourth quarter time intervals and by then selecting the fourth or the second quarter time interval depending on whether the incoming exchange channels are loaded in input register 170 during the first or the second "wait" time. The loading of input register 170 is controlled by the positive-going transition of the 2MCR signal. The first and second "wait" times are determined by the WCG signal which is respectively down and up during the first and second "wait" times. If the WCG signal is up at the positive-going transition of the 2MCR signal, then Select flip-flop 192 is set to "1" and its "true" and "complement" outputs are respectively up and down. Gates 194, 195, 196 act as a single selector that transfers to line 197 the QUAD signal or the −2MCT signal depending on whether the Select flip-flop is set to "1" or to "0".

Figure 12:
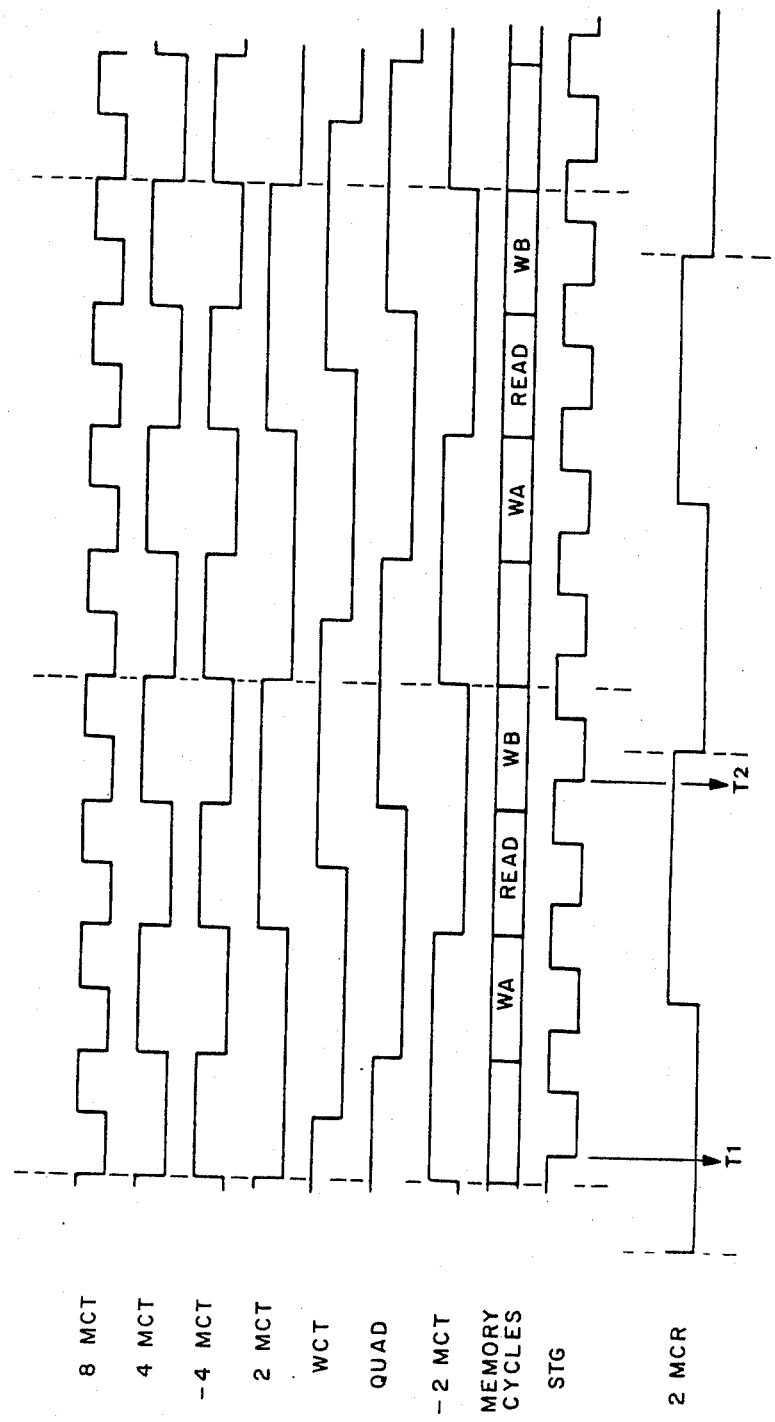
FIG. 12 is a timing diagram depicting the operation of the ring control device 11 of FIG. 11.

FIG. 12 illustrates the case where the transition of the 2MCR signal occurs while the WCG signal is down. The "true" and "complement" outputs of flip-flop 192 are respectively down and up and the −2MCT signal is applied to line 197. During the second quarter time, nothing happens since the −2MCT signal on line 197 inhibits the buffer. During the third quarter time, the −2MCT signal is down and the buffer operates in the Read mode as described above. During the fourth quarter time, the 4MCT signal is up, thereby enabling the address provided by counter IAC to be gated through AND gate 183 to the Address inputs of storage modules 173LO and 173HI, both of which are in the Write mode. When the STG signal goes down, the contents of buses 171 and 172 are written into modules 173LO and 173HI at the address indicated by counter IAC.

If the positive-going transition of the 2MCR signal occurs while WCG is up, the contents of the incoming exchange channels will be written in buffer 173 during the second quarter time interval following the occurrence of this transition. For example, referring to FIG. 12, if the positive-going transition of 2MCR occurs at T1, the buffer will be loaded during the second quarter time interval of the same exchange time slot. If the positive-going transition of 2MCR occurs at T2, then the buffer will be loaded during the second quarter time interval of the next exchange time slot.

Figure 13:
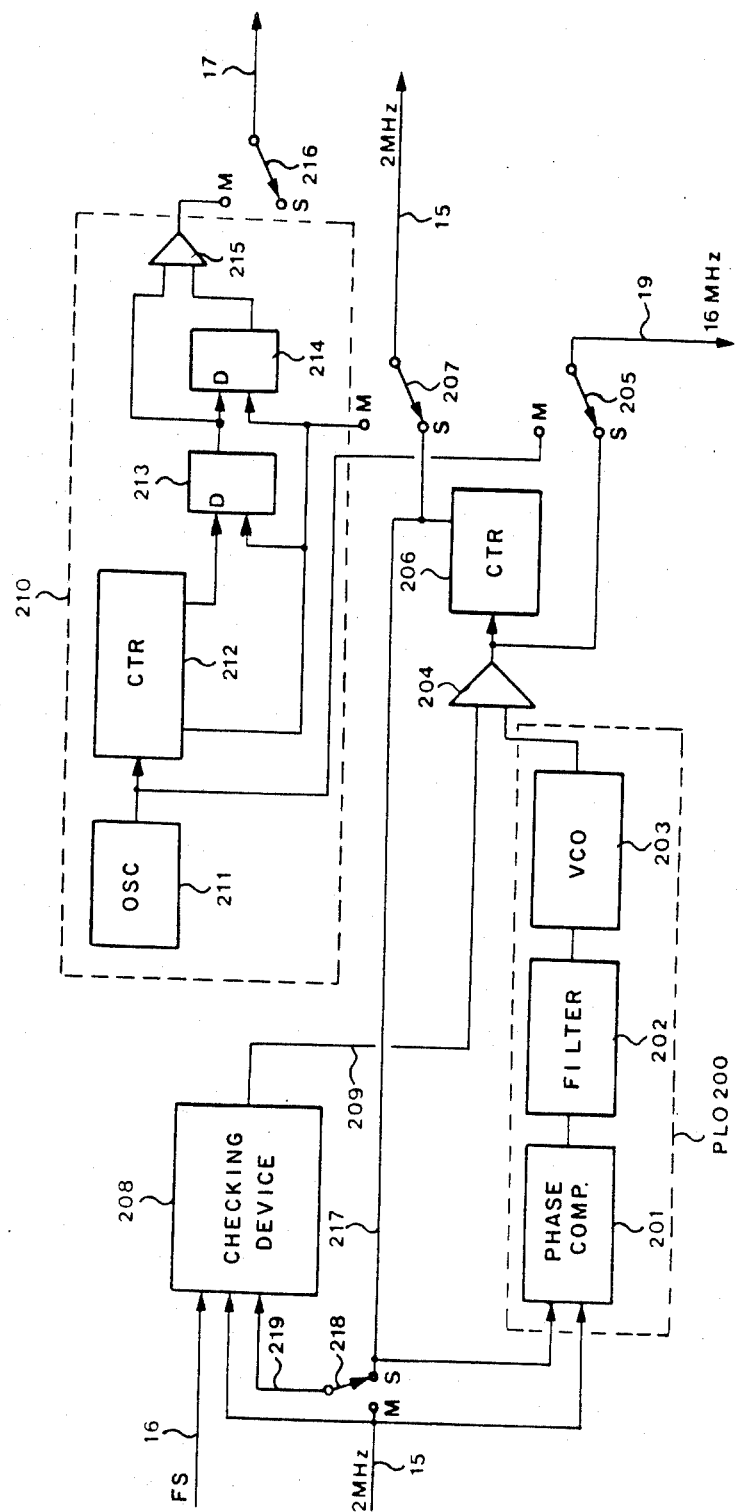
FIG. 13 is an exemplary embodiment of timing devices 13 and 18 of FIG. 1.

Referring now to FIG. 13, there is shown a block diagram of a timing device which illustrates embodiments of master timing device 13 and slave timing device 18. The 2.048 MHz timing signal present on the upstream portion of loop 15 is applied to a phase-locked oscillator (PLO) 200 conventionally comprised of a phase comparator 201, a loop filter 202 and a voltage controlled oscillator (VCO) 203 having a nominal frequency of 16.38 MHz. The output from VCO 203 is applied to an AND gate 204 whose output is connected to one of the terminals, designated S, of a two-terminal switch 205 whose common terminal is connected to line 19 (FIG. 1). The output from AND gate 204 is additionally applied to a 3-stage counter 206 whose output is connected via a line 217 to the other input of phase comparator 201 as well as to one of the terminals, designated S, of a two-terminal switch 207 whose common terminal is connected to the downstream portion of loop 15, and to one of the terminals, designated S, of a two-terminal switch 218. Lines 15 and 16 are connected to a timing signal checking device 208 an exemplary embodiment of which is described in co-pending European patent application Ser. No. 82-4300438 filed Dec. 28, 1982 and assigned to the assignee of this application, and which has its output connected via a line 209 to one input of AND gate 204. Line 15 is further connected to the other terminal, designated M, of switch 218 whose common terminal is connected to device 208 via a line 219. A timing signal source 210 is comprised of a master quartz oscillator 211 with a nominal frequency of 16.384 MHz and an 11-stage counter 212 controlled by the output from oscillator 211, which output is also connected to the other terminal, designated M, of switch 205. The third stage of counter 212 is connected to terminal M of switch 207 and to the clock input of two D-type flip-flops 213 and 214. The eleventh stage of counter 212 is connected to the D input of flip-flop 213 whose "true" output is connected to the D input of flip-flop 214. The "true" output from flip-flop 213 and the "complement" output from flip-flop 214 are applied to an AND gate 215 whose output is connected to one of the terminals, designated M, of a two-terminal switch 216. The other terminal, designated S, of switch 216 is not connected, and its common terminal is connected to line 17 (FIG. 1).

In any slave timing device 18, switches 205, 207, 216 and 218 are all set to position S and no timing signal source is provided. The 2.048 MHz timing signal on line 15 is applied to PLO 200 which produces a filtered 16.384 MHz timing signal in a known manner. In operation, line 209 is up and the signal generated by the PLO is applied to all components of the switching unit via line 19 (FIG. 1). There is obtained at the output of counter 206 a regenerated 2.048 MHz timing signal that is fed back to the input of PLO 200 in a known manner and is also sent over the downstream portion of timing signal line 15. Where no timing signal is present on the upstream portion of line 15 or the timing signal is such that it no longer can control PLO 200 correctly, or more generally where the timing signal is faulty, this condition is detected by device 208 which causes line 209 to go down, thereby inhibiting AND gate 204 and preventing the timing signal on the downstream portion of line 15 and the 16.384 MHz signal from being applied to the components of the switching unit. The signal on line 209 is also sent to controller 20. In a slave timing device, the timing signal checking device 208 also checks that the frame synchronizing signal on line 16 is synchronized with the regenerated timing signal applied to device 208 via line 217, switch 218 (set to position S) and line 219. If the two signals are not synchronized, then device 208 causes line 209 to go down.

In master timing device 13, switches 205, 207, 216, and 218 are all set to position M, and PLO 200 and counter 206 are not provided. The 16.384 MHz signal is supplied by master quartz oscillator 211. The 2.048 MHz timing signal applied to the downstream portion of line 15 is provided by counter 212, and the signal on the line connected to the eleventh stage of counter 212 is a 8 KHz signal with a 50% duty cycle. The 8 KHz signal is obtained at the "true" output of flip-flop 213 in synchronism with the 2.048 MHz signal. The output signal from flip-flop 213, inverted and delayed a time interval equal to the period of the 2.048 MHz signal, i.e. 488 ns, is obtained at the "complement" output of flip-flop 214. Thus, there is obtained at the output of AND gate 215 a train of 8 KHz pulses having a width of 488 ns each. This train of pulses is the frame synchronizing signal that is applied to ring control device 11 via line 17. The timing signal checking device 208 checks the timing signal present on the upstream portion of line 15 and the synchronization between the frame synchronizing signal on line 16 and the timing signal on line 15 as received by device 108 via switch 218 (set to position M) and line 219. Device 208 reports any abnormal condition to controller 20.

Having thus described our inention, what we claim as new, and desire to secure by Letters Patent is:

1. A switching network for selectively connecting at least one input time-division channel on an input multiplex link (IML) to at least one output time-division channel on an output multiplex link, characterized in that it comprises:

a unidirectional closed-loop link (10) operating in the time-division multiplex mode with recurrent frames of equal duration and arranged for continuous circulation of a multiplex message the duration of which equals that of a frame and which includes n time-division exchange channels, a closed-loop synchronization link (12) on which circulates a frame synchronizing signal synchronized with the multiplex message, ring control means (11) for causing the time taken by a multiplex message to travel around the unidirectional closed-loop link (10) to remain constant and equal to the duration of a frame, and a plurality of switching modules each of which connects said unidirectional closed-loop link (10) to an input multiplex link and to the corresponding output multiplex link and includes:

an input time-division switch (IB,IPM) for selectively connecting at least one specific input time-division channel on the input multiplex link to at least one independently selected time-division exchange channel, ring gate means (RG,GPM) for selectively connecting said input time-division switch to said unidirectional closed-loop link, an output time-division switch (OB,OPM) for selectively connecting at the said least one identified time-division exchange channel to at least one said specific output time-division channel on the output multiplex link, control means (135) for controlling the input and output time-division switches in response to control messages received from the controller (20), and a time slot counter (60) synchronized with the frame synchronizing signal to provide synchronization between the input and output time-division switches, the ring gate means and the control means whereby the contents of the independently selected time-division exchange channel are switched to the one specific output channel and information from the said one specific input channel is placed in the said exchange channel under control of the ring gate means.

2. A switching network according to claim 1, characterized in that each input time-division switch comprises:

an input pointer memory (IPM) that is cyclically addressed by the time slot counter at the occurrence of each frame and stores input pointers comprising each an address, with the input pointer stored in the $n^{th}$ location of the input pointer memory including an address representative of the number of the exchange channel to which the $n^{th}$ input channel is connected, and an input buffer (IB) in which the contents of the input time channels are cyclically written at the occurrence of each frame at the addresses specified by the input pointers read out of the input pointer memory, with the contents of the input buffer being cyclically and sequentially read out at the occurrence of each frame under the control of the time slot counter.

3. A switching network according to claim 2, characterized in that said ring gate means comprises:

a gate pointer memory (GPM) that is cyclically addressed by the time slot counter at the occurrence of each frame, and transfer means (RG) from selectively connecting the output of the input time-division switch to the unidirectional closed-loop link under control of the gate pointers read out of the gate pointer memory.

4. A switching network according to claim 1, characterized in that each output time-division switch comprises:

an output pointer memory (OPM) that is cyclically addressed by the time slot counter at the occurrence of each frame and stores output pointers each of which includes an address, with the output pointer stored in the $n^{th}$ location of the output pointer memory including an address representative of the number of the output channel to which the $n^{th}$ exchange channel is connected, and an output buffer (OB) in which the contents of the exchange channels are cyclically written under control of the time slot counter at the occurrence of each frame, with the contents of the output buffer being cyclically and sequentially read out at the occurrence of each frame under control of the output pointers read out of the output pointer memory.

5. A switching network according to claim 1, characterized in that each switching module includes a local time-division switch comprising:

a local pointer memory (LPM) that is cyclically addressed by the time slot counter at the occurrence of each frame and stores local pointers each of which includes an address, with the local pointer stored in the $n^{th}$ location of the local pointer memory including an address representative of the number of the output channel to which the $n^{th}$ input channel is connected, and a local buffer (LB) in which the contents of the input channels on the input multiplex link are cyclically and sequentially written at the occurrence of each frame under control of the time slot counter, with the contents of the local buffer being cyclically read out at the occurrence of each frame under control of the local pointers read out of the local pointer memory.

6. A switching network according to claim 1, characterized in that each switching module includes a local time-division switch comprising:

a local pointed memory (LPM) that is cyclically addressed by the time slot counter at the occurrence of each frame and stores local pointers each of which includes an address, with the local pointer stored in the n$^{th}$ location of the local point memory including an address representative of the number of the output channel to which the n$^{th}$ input channel is connected, and a local buffer (LB) in which the contents of the input channels on the input multiplex link are cyclically and sequentially written at the occurrence of each frame under control of the time slot counter, with the contents of the local buffer being cyclically read out at the occurrence of each frame under control of the local pointers read out of the local point memory; and that each output time-division switch comprises: an output pointer memory (OPM) that is cyclically addressed by the time slot counter at the occurrence of each frame and stores output pointers each of which include an address, with the output pointer stored in the n$^{th}$ location of the output pointer memory including an address representative of the number of the output channel to which the n$^{th}$ exchange channel is connected, and an output buffer (OB) in which the contents of the exchange channels are cyclically written under control of the time slot counter at the occurrence of each frame, with the contents of the output buffer being cyclically and sequentially read out at the occurrence of each frame under control of the output pointers read out of the output pointer memory; and that the output pointer memory and the local pointer memory are comprised each of the same pointer memory (61) storing pointers each of which includes an address and a flag (Local) bit specifying whether the pointer is an output pointer or a local pointer.

7. A switching network according to claim 2, characterized in that it comprises first gate means (107,108) located between the input multiplex link and the input buffer, and in that the input pointers include a marker bit which, when set to a first value, enables the first gate means to connect the input multiplex link to the input of the input buffer, and which, when set to the opposite value, forces the output of the first gate means to zero, thereby causing an all-zero byte to be written into the input buffer.

8. A switching network according to claim 4, characterized in that it comprises second gate means (80) located between the output multiplex link and the output of the output buffer, and in that the output pointers include a market bit which, when set to a first value, enables the second gate means (80) to connect the output of the output buffer to the output multiplex link, and which, when set to the opposite value, forces the output of the second gate means (80) to zero, thereby causing an all-zero byte to be sent over the output multiplex link.

9. A switching network according to claim 6, characterized in that it comprises gate means (80) located between the inputs of the output and local buffers and the output multiplex link, and in that said pointers include a marker bit which, when set to a first value, enables the gate means (80) to connect the outputs of the output and local buffers to the output multiplex link, and which, when set to the opposite value, forces the output of the gate means (80) to zero, thereby causing an all-zero byte to be sent over the output multiplex link.

10. A switching network according to any one of claims 1-5, 7 or 8, characterized in that, to establish a bidirectional communication between a first station, to which a first input channel on a first input multiplex link and a first output channel on a first output multiplex link have been allocated, and a second station, to which a second input channel on a second input multiplex link and a second output channel on a second output multiplex link have been allocated, with the second input and output multiplex links being connected to a second switching module, the addresses contained in the input and output pointers corresponding to the first input and output channels in the first switching module, and the addresses contained in the input and output pointers corresponding to the second input and output channels in the second switching module, specify the address of the same exchange channel.

11. A switching network according to any one of claims 1-5, 7 or 8, characterized in that, to establish a "broadcast" type of communication between one transmitting station, to which a first input channel on a first input multiplex link has been allocated, and several receiving stations, to which output channels on various output multiplex links have been allocated, the address contained in the input pointer corresponding to said first input channel and the address contained in the output pointers corresponding to the output channels allocated to the receiving station specify the address of the same exchange channel.

12. A switching network according to any one of claims 1-5, 7 or 8, characterized in that, to establish a so-called "in-cast" type of communication between several transmitting stations and one receiving station, the addresses contained in the input pointers corresponding to the input channels allocated to the transmitting stations and the address contained in the input pointer corresponding to the output channel allocated to the one receiving station, specify the address of the same exchange channel.

13. A switching network according to claim 6 characterized in that to establish a bidirectional communication between a first station to which a first input channel on a first input multiplex link and a first output channel on a first output multiplex link have been allocated, and a second station, to which a second input channel on a second input multiplex link and a second output channel on a second output multiplex link have been allocated, with the second input and output multiplex links being connected to a second switching module, the addresses contained in the input and output pointers corresponding to the first input and output channels in the first switching module, and the addresses contained in the input and output pointers corresponding to the second input and output channels in the second switching module, specify the address of the same exchange channel.

14. A switching network according to claim 10 characterized in that to establish a bidirectional communication between a first station to which a first input channel on a first input multiplex link and a first output channel on a first output multiplex link have been allocated, and a second station, to which a second input channel on a second input multiplex link and a second output channel on a second output multiplex link have been allocated, with the second input and output multiplex links being connected to a second switching module, the addresses contained in the input and output pointers corresponding to the first input and output channels in the first switching module, and the addresses contained in the input and output pointers corresponding to the second input and output channels in the second switching module, specify the address of the same exchange channel.

15. A switching network according to claim 6 characterized in that to establish a "broadcast" type of communication between one transmitting station, to which a first input channel on a first input multiplex link has been allocated, and several receiving stations, to which output channels on various output multiplex links have been allocated, the address contained in the input pointer corresponding to said first input channel and the address contained in the output pointers corresponding to the output channels allocated to the receiving station specify the address of the same exchange channel.

16. A switching network according to claim 10 characterized in that to establish a "broadcast" type of communication between one transmitting station, to which a first input channel on a first input multiplex link has been allocated, and several receiving stations, to which output channels on various output multiplex links have been allocated, the address contained in the input pointer corresponding to said first input channel and the address contained in the output pointers corresponding to the output channels allocated to the receiving station specify the address of the same exchange channel.

17. A switching network according to claim 6 characterized in that to establish a so-called "in-cast" type of communication between several transmitting stations and one receiving station, the addresses contained in the input pointers corresponding to the input channels allocated to the transmitting stations and the address contained in the input pointer corresponding to the output channel allocated to the one receiving station, specify the address of the same exchange channel.

18. A switching network according to claim 10 characterized in that to establish a so-called "in-cast" type of communication between several transmitting stations and one receiving station, the addresses contained in the input pointers corresponding to the input channels allocated to the transmitting stations and the address contained in the input pointer corresponding to the output channel allocated to the one receiving station, specify the address of the same exchange channel.

* * * * *